(12) United States Patent
Leyton et al.

(10) Patent No.: US 7,305,304 B2
(45) Date of Patent: Dec. 4, 2007

(54) FORECAST DECISION SYSTEM AND METHOD

(75) Inventors: Stephen M. Leyton, Norman, OK (US); Ross Keith, Townsville (AU)

(73) Assignee: The Board of Regents, University of Oklahoma, Norman, OK (US)

( * ) Notice: Subject to any disclaimer, the term of this patent is extended or adjusted under 35 U.S.C. 154(b) by 16 days.

(21) Appl. No.: 11/243,726

(22) Filed: Oct. 5, 2005

(65) Prior Publication Data

US 2006/0085164 A1 Apr. 20, 2006

Related U.S. Application Data

(60) Provisional application No. 60/615,901, filed on Oct. 5, 2004, provisional application No. 60/616,170, filed on Oct. 5, 2004.

(51) Int. Cl.
*G06Q 50/00* (2006.01)
(52) U.S. Cl. .................. 702/3; 701/123; 705/8
(58) Field of Classification Search .................... 702/3, 702/4, 5; 705/7, 8; 701/123
See application file for complete search history.

(56) References Cited

U.S. PATENT DOCUMENTS

| | | | | |
|---|---|---|---|---|
| 5,459,666 | A | * 10/1995 | Casper et al. | 701/123 |
| 5,913,917 | A | * 6/1999 | Murphy | 701/123 |
| 5,928,291 | A | * 7/1999 | Jenkins et al. | 701/1 |
| 2005/0021222 | A1 | * 1/2005 | Minami et al. | 701/123 |
| 2005/0283281 | A1 | * 12/2005 | Hartmann et al. | 701/4 |

OTHER PUBLICATIONS

"An Automated, Observations-Based System for Short-Term Prediction of Ceiling and Visibility"; Robert L. Vislocky and J. Michael Fritsch; Department of Meteorology, The Pennsylvania State University, University Park, Pennsylvania; Mar. 1997; pp. 31-43.

"An Observations-Based Statistical System for Warm-Season Hourly Probabilistic Forecasts of Low Ceiling at the San Franciso International Airport"; Joey L. Hilliker and J. Michael Fritsch, Journal of Applied Meteorology, vol. 38, pp. 1692-1705, Dec. 1999.

(Continued)

*Primary Examiner*—Donald E McElheny, Jr.
(74) *Attorney, Agent, or Firm*—Dunlap, Codding & Rogers, P.C.

(57) ABSTRACT

A system and method for making a decision of whether to carry additional fuel on an aircraft for a particular flight based on a forecast, such as for low visibility and ceiling. Preferably, observations-based probabilistic forecasts are utilized. The forecast probability of the weather at the planned aerodrome being below a prescribed minimum level is calculated using statistical regression analysis of past data. An optimal probability is estimated using cost parameters on an individual flight bases. If this forecast probability is greater than the optimal probability for a particular flight, then extra fuel is carried by that flight. This is in contrast to current practice whereby the same categorical forecast is applied to all flights. The combination of improved short-term forecasts and identification of optimal forecast probabilities minimizes the financial impact of errors and weather forecasts on airline operations thereby providing a superior financial outcome.

12 Claims, 22 Drawing Sheets

OTHER PUBLICATIONS

"Optimization of Value of Aerodrome Forecasts"; Ross Keith; Bureau of Meteorology, and School of Mathematical and Physical Sciences, James Cook University, Townsville, Australia; vol. 18, pp. 808-824, Oct. 2003.

"Short-Term Probabilistic Forecasts of Ceiling and Visibility Utilizing High-Density Surface Weather Observations"; Stephen M. Leyton and J. Michael Fritsch, Department of Meteorology, The Pennsylvania State University, University Park, Pennsylvania; Oct. 2003; pp. 891-902.

"The Impact of High-Frequency Surface Weather Observations on Short-Term Probabilistic Forecasts of Ceiling and Visibility"; Stephen M. Leyton and J. Michael Fritsch; Jan. 2004; pp. 145-156.

"The Impact of High-Frequency Surface Weather Observations of Short-term Probabilistic Forecasts of Ceiling and Visibility"; Stephen M. Leyton and J. Michael Fritsch; Submitted: Jul. 5, 2002; pp. 1-47.

"Short-Term Probabilistic Forecasts of Ceiling and Visibility Utilizing High-Density Surface Weather Observations"; Stephen M. Leyton and J. Michael Fritsch; Submitted; Jun. 11, 2002; pp. 1-45.

"Short-Term Probailistic Forecasts of Ceiling and Visibility Utilizing High-Density and High-Frequency Surface Weather Observations" The Pennsylvania State University, The Graduate School, College of Earth and Mineral Sciences; A Thesis in Meteorology by Stephen M. Leyton; Submitted in Partial Fulfillment of the Requirements for the Degree of Master of Science, May 2002; 66 pages.

* cited by examiner

| Variable | Binary threshold | Flight rules |
|---|---|---|
| Ceiling height | ≤ 500 feet | LIFR |
| Ceiling height | ≤ 1000 feet | IFR |
| Ceiling height | ≤ 3000 feet | MVFR |
| Visibility | ≤ 1 mile | LIFR |
| Visibility | ≤ 3 miles | IFR |

*Fig. 2*

| Variable | Binary threshold |
|---|---|
| Station climatology of predictand | — |
| Sine of the day of year | — |
| Cosine of the day of year | — |

*Fig. 4*

| Parameter | Binary Threshold |
|---|---|
| Total cloud cover | = clear |
| Total cloud cover | = few |
| Total cloud cover | = scattered |
| Total cloud cover | = broken |
| Total cloud cover | = overcast |
| Total cloud cover | = obscured |
| Total cloud cover | $\geq$ few |
| Total cloud cover | $\geq$ scattered |
| Total cloud cover | $\geq$ broken |
| Precipitation occurrence | = yes |
| Ceiling height | $\leq$ 500 feet |
| Ceiling height | $\leq$ 1000 feet |
| Ceiling height | $\leq$ 3000 feet |
| Visibility | $\leq$ 1 mile |
| Visibility | $\leq$ 3 miles |
| Wind direction | 22.5-67.5 degrees (NE) |
| Wind direction | 67.5-112.5 degrees (E) |
| Wind direction | 112.5-157.5 degrees (SE) |
| Wind direction | 157.5-202.5 degrees (S) |
| Wind direction | 202.5-247.5 degrees (SW) |
| Wind direction | 247.5-292.5 degrees (W) |
| Wind direction | 292.5-337.5 degrees (NW) |
| Wind direction | 337.5-22.5 degrees (N) |
| Wind speed | — |
| Dew point | — |
| Dew point depression | — |
| Relative humidity | — |

*Fig 3*

| Variable | Binary Threshold |
|---|---|
| Fraction of ceiling ≤ 500 feet past 15 min. | — |
| Fraction of ceiling ≤ 1000 feet past 15 min. | — |
| Fraction of ceiling ≤ 3000 feet past 15 min. | — |
| Fraction of visibility ≤ 1 mile past 15 min. | — |
| Fraction of visibility ≤ 3 mile past 15 min. | — |
| Fraction of ceiling ≤ 500 feet past 30 min. | — |
| Fraction of ceiling ≤ 1000 feet past 30 min. | — |
| Fraction of ceiling ≤ 3000 feet past 30 min. | — |
| Fraction of visibility ≤ 1 mile past 30 min. | — |
| Fraction of visibility ≤ 3 mile past 30 min. | — |
| Fraction of ceiling ≤ 500 feet past 60 min. | — |
| Fraction of ceiling ≤ 1000 feet past 60 min. | — |
| Fraction of ceiling ≤ 3000 feet past 60 min. | — |
| Fraction of visibility ≤ 1 mile past 60 min. | — |
| Fraction of visibility ≤ 3 mile past 60 min. | — |
| Ceiling trend past 15 min. | — |
| Ceiling trend past 30 min. | — |
| Ceiling trend past 60 min. | — |
| Visibility trend past 15 min. | — |
| Visibility trend past 30 min. | — |
| Visibility trend past 60 min. | — |
| Ceiling standard deviation past 15 min. | — |
| Ceiling standard deviation past 30 min. | — |
| Ceiling standard deviation past 60 min. | — |
| Visibility standard deviation past 15 min. | — |
| Visibility standard deviation past 30 min. | — |
| Visibility standard deviation past 60 min. | — |

*Fig 5*

| Forecast | Observed | |
|---|---|---|
| | No | Yes |
| No | a | b |
| Yes | c | d |

(a)

TVL Forecaster A  
Distribution of INTER forecasts:  
Number of forecasts: 323

| | 0% | 10% | 20% | 30% | 40% | 50% | 60% | 70% | 80% | 90% | 100% | No. of times INTER forecast | No. of actual events |
|---|---|---|---|---|---|---|---|---|---|---|---|---|---|
| 1 hr lead | 0 | 6 | 11 | 11 | 0 | 0 | 3 | 0 | 0 | 0 | 0 | 31 | 11 |
| 3 hr lead | 0 | 3 | 14 | 16 | 2 | 1 | 0 | 0 | 0 | 0 | 0 | 35 | 14 |
| 6 hr lead | 0 | 4 | 17 | 18 | 2 | 1 | 0 | 0 | 0 | 0 | 0 | 42 | 11 |
| 12 hr lead | 0 | 4 | 19 | 18 | 1 | 0 | 0 | 0 | 0 | 0 | 0 | 42 | 9 |
| 18 hr lead | 0 | 4 | 14 | 14 | 1 | 1 | 0 | 0 | 0 | 0 | 0 | 34 | 9 |

Distribution of TEMPO forecasts:

| | 0% | 10% | 20% | 30% | 40% | 50% | 60% | 70% | 80% | 90% | 100% | No. of times INTER forecast | No. of actual events |
|---|---|---|---|---|---|---|---|---|---|---|---|---|---|
| 1 hr lead | 0 | 0 | 2 | 3 | 0 | 1 | 2 | 0 | 0 | 0 | 0 | 13 | 11 |
| 3 hr lead | 0 | 1 | 2 | 6 | 1 | 6 | 0 | 0 | 0 | 0 | 0 | 17 | 14 |
| 6 hr lead | 0 | 2 | 5 | 7 | 2 | 5 | 0 | 0 | 0 | 0 | 0 | 21 | 11 |
| 12 hr lead | 0 | 3 | 6 | 8 | 1 | 3 | 0 | 0 | 0 | 0 | 0 | 22 | 9 |
| 18 hr lead | 0 | 3 | 3 | 8 | 0 | 3 | 0 | 0 | 0 | 0 | 0 | 17 | 9 |

(b)

TVL Forecaster B  
Distribution of INTER forecasts:  
Number of forecasts: 259

| | 0% | 10% | 20% | 30% | 40% | 50% | 60% | 70% | 80% | 90% | 100% | No. of times INTER forecast | No. of actual events |
|---|---|---|---|---|---|---|---|---|---|---|---|---|---|
| 1 hr lead | 0 | 1 | 1 | 4 | 3 | 3 | 0 | 0 | 0 | 0 | 0 | 12 | 5 |
| 3 hr lead | 0 | 0 | 1 | 9 | 4 | 3 | 0 | 0 | 0 | 0 | 0 | 17 | 4 |
| 6 hr lead | 0 | 0 | 4 | 13 | 2 | 1 | 0 | 0 | 0 | 0 | 0 | 20 | 8 |
| 12 hr lead | 0 | 0 | 5 | 11 | 3 | 0 | 0 | 0 | 0 | 0 | 0 | 19 | 4 |
| 18 hr lead | 0 | 0 | 6 | 9 | 1 | 0 | 0 | 0 | 0 | 0 | 0 | 16 | 5 |

Distribution of TEMPO forecasts:

| | 0% | 10% | 20% | 30% | 40% | 50% | 60% | 70% | 80% | 90% | 100% | No. of times TEMPO forecast | No. of actual events |
|---|---|---|---|---|---|---|---|---|---|---|---|---|---|
| 1 hr lead | 0 | 0 | 1 | 1 | 2 | 2 | 5 | 2 | 0 | 0 | 0 | 13 | 5 |
| 3 hr lead | 0 | 0 | 0 | 4 | 3 | 2 | 1 | 0 | 0 | 0 | 0 | 10 | 4 |
| 6 hr lead | 0 | 0 | 1 | 2 | 5 | 0 | 1 | 0 | 0 | 0 | 0 | 10 | 8 |
| 12 hr lead | 0 | 0 | 5 | 5 | 7 | 2 | 0 | 0 | 0 | 0 | 0 | 19 | 4 |
| 18 hr lead | 0 | 0 | 5 | 6 | 5 | 2 | 0 | 0 | 0 | 0 | 0 | 18 | 5 |

| TVL Forecaster C<br>Distribution of INTER forecasts: | | | | | | | | | | | No. of times INTER forecast | No. of actual events |
|---|---|---|---|---|---|---|---|---|---|---|---|---|
| 0% | 10% | 20% | 30% | 40% | 50% | 60% | 70% | 80% | 90% | 100% | | |
| 1 hr lead | | | | | | | | | | | | |
| 0 | 1 | 4 | 9 | 4 | 0 | 0 | 0 | 1 | 1 | 0 | 20 | 17 |
| 3 hr lead | | | | | | | | | | | | |
| 0 | 0 | 5 | 6 | 7 | 2 | 0 | 1 | 0 | 1 | 0 | 22 | 13 |
| 6 hr lead | | | | | | | | | | | | |
| 0 | 1 | 7 | 12 | 4 | 1 | 1 | 0 | 1 | 0 | 0 | 28 | 18 |
| 12 hr lead | | | | | | | | | | | | |
| 0 | 1 | 5 | 20 | 6 | 1 | 1 | 1 | 0 | 0 | 0 | 35 | 17 |
| 18 hr lead | | | | | | | | | | | | |
| 0 | 0 | 7 | 14 | 5 | 3 | 3 | 0 | 0 | 0 | 0 | 32 | 12 |

Number of forecasts: 411

| Distribution of TEMPO forecasts: | | | | | | | | | | | No. of times TEMPO forecast | No. of actual events |
|---|---|---|---|---|---|---|---|---|---|---|---|---|
| 0% | 10% | 20% | 30% | 40% | 50% | 60% | 70% | 80% | 90% | 100% | | |
| 1 hr lead | | | | | | | | | | | | |
| 0 | 0 | 3 | 0 | 3 | 5 | 0 | 2 | 5 | 5 | 4 | 27 | 13 |
| 3 hr lead | | | | | | | | | | | | |
| 0 | 0 | 0 | 3 | 4 | 4 | 5 | 3 | 4 | 7 | 1 | 31 | 9 |
| 6 hr lead | | | | | | | | | | | | |
| 0 | 0 | 2 | 6 | 0 | 9 | 8 | 6 | 4 | 0 | 0 | 35 | 12 |
| 12 hr lead | | | | | | | | | | | | |
| 0 | 1 | 0 | 6 | 9 | 4 | 6 | 6 | 2 | 1 | 0 | 35 | 11 |
| 18 hr lead | | | | | | | | | | | | |
| 0 | 1 | 0 | 12 | 6 | 7 | 2 | 2 | 3 | 0 | 0 | 36 | 8 |

*Fig. 13B*

(a)
VRO Forecaster A    Number of forecasts: 247

Distribution of INTER forecasts:

| | 0% | 10% | 20% | 30% | 40% | 50% | 60% | 70% | 80% | 90% | 100% | No. of times INTER forecast | No. of actual events |
|---|---|---|---|---|---|---|---|---|---|---|---|---|---|
| 1 hr lead | 0 | 0 | 2 | 3 | 6 | 0 | 0 | 0 | 0 | 0 | 0 | 11 | 5 |
| 3 hr lead | 0 | 0 | 3 | 5 | 2 | 1 | 0 | 0 | 0 | 0 | 0 | 11 | 4 |
| 6 hr lead | 0 | 0 | 4 | 6 | 2 | 0 | 0 | 0 | 0 | 0 | 0 | 12 | 9 |
| 12 hr lead | 0 | 1 | 3 | 8 | 5 | 1 | 0 | 0 | 0 | 0 | 0 | 18 | 11 |
| 18 hr lead | 0 | 1 | 3 | 9 | 6 | 1 | 0 | 0 | 0 | 0 | 0 | 20 | 9 |

Distribution of Alternate forecasts:

| | 0% | 10% | 20% | 30% | 40% | 50% | 60% | 70% | 80% | 90% | 100% | No. of times INTER forecast | No. of actual events |
|---|---|---|---|---|---|---|---|---|---|---|---|---|---|
| 1 hr lead | 0 | 0 | 0 | 1 | 0 | 0 | 1 | 2 | 1 | 3 | 2 | 10 | 5 |
| 3 hr lead | 0 | 0 | 0 | 1 | 0 | 0 | 1 | 3 | 3 | 2 | 2 | 12 | 5 |
| 6 hr lead | 0 | 0 | 0 | 1 | 0 | 0 | 1 | 2 | 4 | 3 | 2 | 13 | 9 |
| 12 hr lead | 0 | 0 | 1 | 2 | 0 | 1 | 1 | 3 | 4 | 1 | 1 | 14 | 11 |
| 18 hr lead | 0 | 0 | 0 | 2 | 0 | 0 | 1 | 3 | 3 | 2 | 0 | 11 | 9 |

VRO Forecaster B    Number of forecasts: 267

(b)

Distribution of INTER forecasts:

| | 0% | 10% | 20% | 30% | 40% | 50% | 60% | 70% | 80% | 90% | 100% | No. of times INTER forecast | No. of actual events |
|---|---|---|---|---|---|---|---|---|---|---|---|---|---|
| 1 hr lead | 0 | 3 | 2 | 3 | 2 | 0 | 0 | 0 | 0 | 0 | 0 | 10 | 4 |
| 3 hr lead | 0 | 3 | 4 | 3 | 3 | 1 | 0 | 0 | 0 | 0 | 0 | 14 | 8 |
| 6 hr lead | 0 | 4 | 4 | 5 | 3 | 1 | 0 | 0 | 0 | 0 | 0 | 17 | 7 |
| 12 hr lead | 0 | 3 | 2 | 4 | 3 | 0 | 0 | 0 | 0 | 0 | 0 | 12 | 9 |
| 18 hr lead | 0 | 6 | 4 | 3 | 1 | 0 | 0 | 0 | 0 | 0 | 0 | 14 | 8 |

Distribution of Alternate forecasts:

| | 0% | 10% | 20% | 30% | 40% | 50% | 60% | 70% | 80% | 90% | 100% | No. of times ALT forecast | No. of actual events |
|---|---|---|---|---|---|---|---|---|---|---|---|---|---|
| 1 hr lead | 0 | 0 | 0 | 1 | 2 | 3 | 1 | 0 | 2 | 1 | 0 | 10 | 4 |
| 3 hr lead | 0 | 0 | 0 | 1 | 1 | 3 | 1 | 2 | 1 | 0 | 0 | 9 | 8 |
| 6 hr lead | 0 | 0 | 1 | 1 | 2 | 6 | 1 | 1 | 0 | 0 | 0 | 12 | 7 |
| 12 hr lead | 0 | 1 | 1 | 2 | 3 | 1 | 2 | 2 | 0 | 0 | 0 | 12 | 9 |
| 18 hr lead | 0 | 0 | 0 | 1 | 1 | 5 | 1 | 0 | 0 | 0 | 0 | 8 | 8 |

*Fig. 14*

Relevant costs for flights from Singapore to Melbourne.

| | |
|---|---|
| Cost to carry diversion fuel | $C |
| Cost to divert from Melbourne to Adelaide | $E |
| Landing and handling fees at Adelaide | $F |
| Cost of fuel flying Adelaide to Melbourne | $H |
| Cost of unused fuel TBD into Melbourne | $I |

*Fig. 22*

| Approx. Flight: Distance to Major Airport | Costs Using TAFs | Costs Using Obs-Based Forecasts | Savings Using Obs-Based Forecasts |
|---|---|---|---|
| 1100 miles to airport #1 | $54406 | $31387 | $23019 |
| 1400 miles to airport #1 | $71388 | $59914 | $11474 |
| 1600 miles to airport #1 | $113996 | $97688 | $16308 |
| 2500 miles to airport #1 | $88743 | $78272 | $10501 |
| 200 miles to airport #2 | $28848 | $12444 | $16404 |
| 1650 miles to airport #2 | $30738 | $14721 | $16017 |
| 250 miles to airport #2 | $21706 | $8859 | $12847 |
| 550 miles to airport #2 | $50136 | $8370 | $41766 |
| 1450 miles to airport #2 | $54636 | $14076 | $40560 |
| 550 miles to airport #2 | $77768 | $35688 | $42080 |
| 1400 miles to airport #3 | $37106 | $10704 | $26402 |
| 1600 miles to airport #3 | $50983 | $26776 | $24207 |
| 500 miles to airport #3 (1) | $65430 | $38730 | $26700 |
| 500 miles to airport #3 (2) | $36943 | $28795 | $8148 |
| 450 miles to airport #3 (1) | $82723 | $42067 | $40656 |
| 450 miles to airport #3 (2) | $57849 | $34048 | $23801 |
| 250 miles to airport #3 | $43049 | $19543 | $23506 |
| 1050 miles to airport #3 | $44441 | $21846 | $21846 |
| TOTAL COSTS | $1010889 | $583928 | $426961 |

*Fig. 27*

FORECAST DECISION SYSTEM AND METHOD

CROSS-REFERENCE TO RELATED APPLICATIONS

The present application claims priority to the provisional application identified by the U.S. Ser. No. 60/615,901, filed Oct. 5, 2004, and the provisional application identified by the U.S. Ser. No. 60/616,170, filed Oct. 5, 2004; the entire contents of which are hereby expressly incorporated herein by reference.

STATEMENT REGARDING FEDERALLY SPONSORED RESEARCH OR DEVELOPMENT

The present invention was funded in part by Federal Aviation Administration Research Grant 200-G-006.

BACKGROUND OF THE INVENTION

Weather forecasts and the accuracy of such forecasts can have significant impacts on operations which are weather dependent, such as operations performed by the airline industry. For example, predictions of short-term variations of vital boundary layer conditions at airports, such as for visibility and ceiling, impact departures and arrivals at airports across the nation and are important to the safe and economic operation of airlines. Airline dispatchers must account for the possibility of delays due to impeding weather phenomena and decide whether extra fuel should be loaded onto an aircraft. It is important to note that the decision to carry extra fuel necessitates additional fuel to carry this extra weight; additional fuel which will incur an extra cost because it will be "burned off" en route.

Traditionally, these decisions of assigning fuel carriage have been made using National Weather Service (NWS) issued Terminal Aerodrome Forecasts (TAFs), which supply categorical forecasts of weather for aviation interests. The forecasts are categorical in that they provide a "yes" or "no" type of prediction. These traditional TAFs suffer from problems of being subjective because they generally depend on the whims of individual forecasters who have varying attitudes toward risk (e.g., some forecasters may be more conservative than others). Further, the same TAF is generally applied to all aircraft regardless of operating costs associated with the aircraft and its particular flight plan. For example, an airline operating a B777 and an airline operating a twin otter may use the same TAF.

Therefore, there is a need for a more accurate and cost effective system and method for making decisions as to whether extra fuel is to be carried by an aircraft for a particular flight. It is to such a system and method that the present invention is directed.

SUMMARY OF THE INVENTION

The present invention relates to a system and method for making a decision based on a forecast. More particularly, the present invention relates to a system and method that optimizes the flow of a forecast opinion directly to the user, and further utilizes the forecast in an optimal way, given the relative costs of occurrence of the event and protection from the event to the user.

In one embodiment, the present invention allows for short-term forecasts and the calculation of the potential value in reliable estimations of the probability of low visibility and ceiling (i.e., cloud base) at aerodromes. The value is estimated by using cost parameters on an individual flight basis. Preferably, observations-based probabilistic forecasts are utilized by the present invention because such forecasts provide probabilities beyond simply 0% and 100% likelihood of a weather condition occurring. Thus, this type of forecast generally increases the value of the forecast to aviation interests. The combination of improved short-term forecasts and identification of critical forecast probabilities by the present invention leads to greater forecast value.

BRIEF DESCRIPTION OF THE DRAWINGS

FIG. 2 shows a table listing exemplary predictands

FIG. 3 shows a table of exemplary surface observations used as predictors.

FIG. 4 shows a table of exemplary climatic terms used as predictors.

FIG. 5 shows a table of exemplary statistical terms derived from high-frequency observations used as predictors.

FIG. 13 shows tables for exemplary numbers of forecasts of INTER and TEMPO, regardless of outcome, for three exemplary forecasters at Townsville.

FIG. 14 shows tables for exemplary numbers of forecasts of INTER and ALT, regardless of outcome, for two exemplary forecasters at Vic RFC.

FIG. 22 shows a table of the relevant costs for exemplary flights from Singapore to Melbourne.

FIG. 27 shows a table comparison of exemplary cumulative costs per flight, for an exemplary period of April 2002 to May 2003, using exemplary TAFs and observations-based probabilistic forecast of low ceiling and/or reduced visibility. The dollar amounts are in 2003 U.S. dollars. The (1) and (2) represent the same flight route but different departure/arrival times, and each exemplary flight if identified by the distance traveled and to which exemplary airport each arrived.

DETAILED DESCRIPTION OF THE INVENTION

Figure 1:
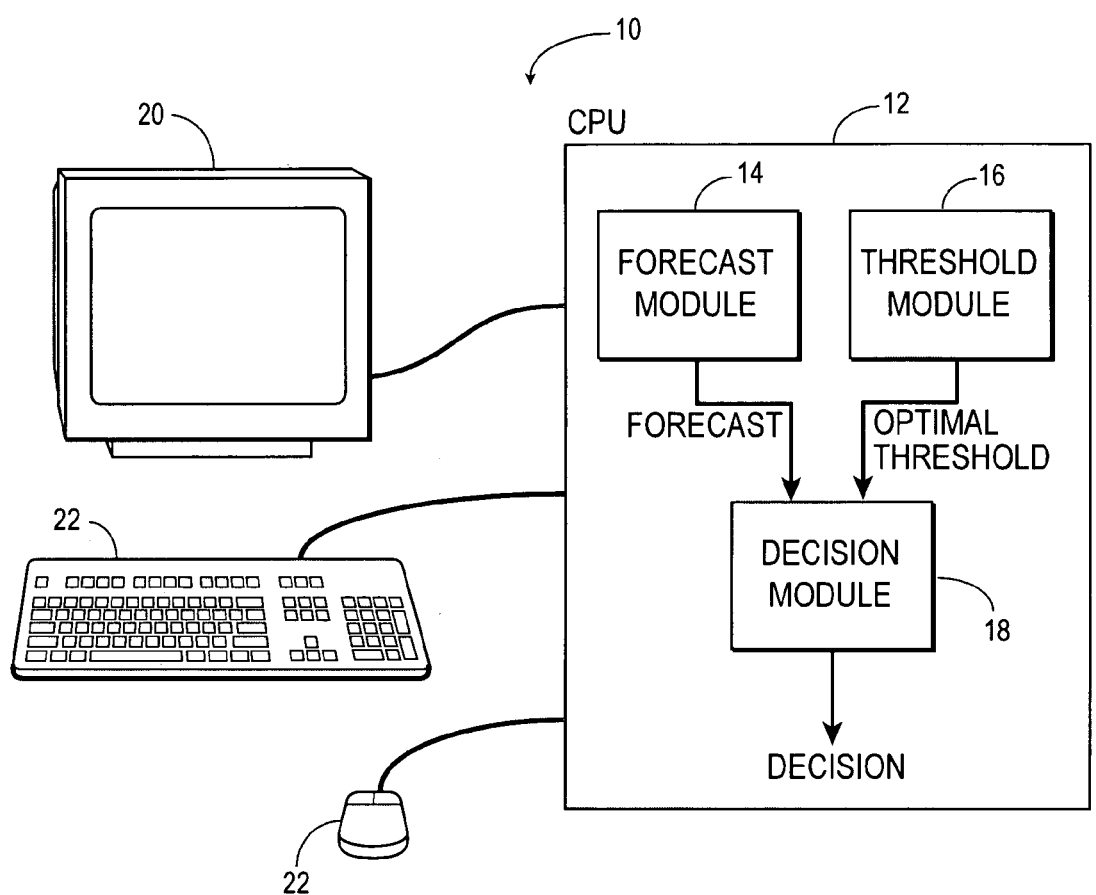
FIG. 1 is a schematic diagram of a system for making a decision, which is constructed in accordance of the present invention.

Referring now to the drawings and in particular to FIG. 1, shown therein and labeled by the general reference numeral 10 is a system for making a decision. In general, the system 10 utilizes a weather forecast and an optimal threshold determination to make a decision for a user.

In one embodiment, the user of the system 10 is an airline. The airline embodiment of the present invention is highlighted due to the large financial impact that weather forecasts have on airline operations. Generally, airlines want to use weather forecasts in a way that optimizes economic outcome of the airline operations without compromising safety. However, it should be understood that the present invention can be utilized in other applications, such as for example in military operations.

An exemplary decision being made for the airline for purposes of illustration of the present invention is whether extra fuel should be carried by an aircraft for a specified flight. For example, additional fuel may be required if a weather forecast of a desired destination is below a predetermined alternate minimum, such as ceiling less than two thousand feet and/or visibility less than three miles.

The system 10 utilizes a forecast and a critical threshold to make a decision as to whether alternate or additional fuel should be assigned for a particular flight. In a general operation, the system 10 in a first step creates or receives forecasts of weather events of interest (e.g., low ceiling and/or reduced visibility) for a desired destination (e.g., where a plane is scheduled to land). The system 10 then calculates a critical probability threshold for the flight using operating costs data associated with that flight. The probabilistic forecast is then compared to the calculated critical probability for each flight to determine whether the forecast would require additional fuel carriage.

In one embodiment, the system 10 of the present invention provides probabilistic Terminal Aerodrome Forecasts (TAFs) which are expressed as estimated probabilities of breaching an alternate minimum, i.e., probabilities that significant weather events at the airport are below minimums that would require an aircraft to carry additional fuel to proceed to an alternate destination should they not be able to land at the desired destination. This enables airlines to utilize the value in reasonably reliable estimates of the probability of occurrence of events so as to obtain economic benefit through lower fuel usage. Preferably, the decisions determined by the system 10 are provided in the probabilistic TAFs.

As shown in FIG. 1, in one embodiment, the system 10 is a computer system that includes software that is stored on a memory (not shown), or made otherwise accessible (e.g., via an intranet or internet connection), to a CPU 12. The software includes a forecast module 14, a threshold module 16 and a decision module 18. The system 10 perferably also includes at least one output device 20 (e.g., a monitor or printer) and at least one input device 22 (e.g., a keyboard or mouse).

Preferably, the forecast module 14 generates at least one forecast for a desired destination (e.g., where an aircraft is scheduled to land). In one embodiment, there are a plurality of alternate minimums of interest, which preferably include the level of visibility and ceiling which requires an aircraft to carry extra fuel. More particularly, in one embodiment the forecasts of interest are the probability of ceiling $\leq 2000$ ft. and/or visibility<3 SM. The reason for these thresholds is that they are current FAA criteria for determining whether a given flight should add additional jet fuel in case the flight has to divert to an alternate landing site. However, it should be understood that the system 10 can be adapted to determine the forecast probability for other weather conditions, such as precipitation, thunder storms, convection, etc.

In one embodiment, the forecast module 14 utilizes an observations-based statistical technique to generate short-term forecasts of surface weather conditions, such as described in detail by R. L. Vislocky, and J. M. Fritsch in "An automated, observations-based system for shortterm prediction of ceiling and visibility," Wea. Forecasting, 12, 31-43 (1997), the entire content of which is hereby expressly incorporated herein by reference. In such an approach, a network of surface observations surrounding an observing site (e.g., at a desired destination airport) is used to produce probabilistic forecasts of ceiling and visibility for that observing site. Such surface observations relate to weather conditions such as for example temperature, wind speed, wind direction, dew point, precipitation, relative humidity, cloud coverage, ceiling, visibility, fog, etc. While surface-based observations are preferably utilized, it should be understood that other types of observations and combinations thereof can be used in accordance with the present invention. For example, upper air observations could be used to forecast a broad range of weather (e.g., freezing rain, turbulence, thunderstorms, etc.).

In general, weather data indicative of observations of weather conditions are collected on an hourly basis for approximately 1500 locations across the continental United States (e.g., a weather station at an airport) and stored in at least one database (not shown) which is accessible by the forecast module. The database can be local or remote from the computer system 12.

Further, an increase in forecast skill can be obtained when utilizing higher density and higher frequency surface observations for short-term forecasts, as demonstrated by S. M. Leyton (a co-inventor of the present invention) and J. M. Fritsch in "Short-term probabilistic forecasts of ceiling and visibility utilizing high-density surface weather observations," Wea. Forecasting, 18, 891-902 (2003) and in "The impact of high-frequency surface weather observations on short-term probabilistic forecasts of ceilings and visibility," J. Appl. Meteor., 43, 145-156. (2004); the entire contents of which are hereby expressly incorporated herein by reference. It is preferable that the observing sites collect weather condition information at a high frequency (e.g., in five minute observations) so as to form a broad collection and more continuous temporal resolution of weather data. For example, archiving of five-minute observations has been conducted by select Automated Surface Observation Systems (ASOS) and Automated Weather Observation Systems (AWOS) around the U.S. However, it should be understood that weather data collected by some of the observing sites can be lower in frequency. It is also preferable that weather data be collected from a plurality of observing sites at a plurality of locations so as to form a broad territorial collection of weather data. For example, five-minute observations can be taken by a plurality of observation sites (e.g., fifteen hundred sites) across the United States.

Because high-frequency observations are not available in real-time, radar data, which are available in real-time, could provide additional forecast skill when considering low ceiling and visibility events. In many instances, the presence of low ceiling and visibility co-exists with the presence of falling precipitation. With this in mind, the benefit of radar information is two-fold. For one, a new radar image is available every six (precipitation mode) or ten (clear air mode) minutes, allowing for a more accurate identification of the arrival or departure of impeding phenomena. In addition, radar images provide current conditions between the surface observing sites. In this sense, the radar "behaves" like a high-density and high-frequency observing network. Likewise, high-resolution satellite imagery (both visible and infrared) has great potential for use in a statistical forecasting scheme, as this imagery provides updated information between observation sites and times.

Additional skill in statistical forecast systems could also be attained by stratifying weather events within the developmental data sets. For example, in one embodiment, no regard is for different types of events, and instead, all events are treated as the same due to a cases-to-predictors dilemma. Because of this, it is possible that there can be conflicting correlations between observation sites depending on the events. Stratification would tend to lessen this conflict and likely provide improved forecasts To generate forecasts using the statistical technique in accordance with the present invention, the weather data collected are preferably preprocessed. Preprocessing the weather data includes the steps of checking for "bad" data (i.e., inconsistencies in a data set), identifying instances of missing data, and replacing the bad or missing data with surrogate values. Unlike the simple identification of missing data, the recognition of "bad" data can be more complex. Preferably, observations are passed through a series of quality control (QC) systems before being archived in the database, in a similar manner as done for the mass storage system at the National Center of Atmospheric Research (NCAR) (see "ASOS user's guide," ASOS Program Office, National Weather Service (1998)). This procedure involves the data first passing through an internal QC algorithm at the observation site followed by editing, as necessary, by a present observer. Finally, the data passes through an external QC algorithm (e.g., by the system 10) to ensure that each value falls within a suitable range. If any value is deemed "bad" by any of these QC algorithms, that value is considered missing. Further, more extensive QC procedures can also perform spatial and temporal checks of the observation data, such as those performed for the system for the Oklahoma Mesonet data, discussed by Shafer et al. in "Quality assurance procedures in the Oklahoma Mesonet," J. Atmos. Oceanic Technol., 17, 474-494 (2000) and summarized by Fiebrich and Crawford in "The impact of unique meteorological phenomena detected by the Oklahoma Mesonet and ARS Micronet on automated quality control," Bull. Amer. Meteor. Soc., 82, 2173-2188 (2001); the entire contents of which are hereby expressly incorporated herein by reference.

For statistical forecast equation development, it is preferred that bad and missing observations be replaced with surrogate values, even though they comprise a very small portion of the total possible observations. A single missing observation at any single site could render that hour completely unusable for statistical analysis at many sites since predictand or predictor information would be unavailable from that site. With this in mind, due to random occurrences of bad or missing observations, many hours may be unusable, leading to a considerable reduction in the available data. Therefore, it is preferable to substitute surrogate values for the bad and/or missing data.

The substitution of surrogate values can be made using for example methods of climatology, conditional climatology, persistence, nearest-neighbor techniques, or combinations thereof. Climatology is simply the long-term average of a weather parameter. In some instances, however, a mean value has little significance if the climatological value of a weather parameter is skewed toward one end of its continuous range. Therefore, it is more valuable to compute a conditional climatology, which identifies the typical trend over time of the parameter based on the present condition. Persistence is the continuation of a weather condition from one observation to the next. The nearest-neighbor techniques involve the use of observations from surrounding sites.

With a complete set of quality observations available, data sets of surface observations are used as predictors in a multiple regression technique to produce forecast equations for a desired destination. For forecasting for a particular location, the forecast module 14 preferably utilizes weather data from a set of observing sites in an area or region at or near a location of interest, wherein the observing sites are in close proximity to one another. For example, for the New York City area, observations can be made at LaGuardia International Airport in New York (LGA), John F. Kennedy International Airport in New York (JFK), Newark International Airport in New Jersey (EWR), Central Park in New York (NYC) and Sikorsky Memorial Airport in Bridgeport, Conn. (BDR).

In the statistical technique, those predictors that are significant in forecasting a certain weather condition, such as for example low ceiling and visibility, are identified. Then linear regression is utilized to reduce the pool of potential predictors to a manageable size, followed by logistic regression to derive the final statistical forecast equations.

In one embodiment, the statistical forecasts are obtained by the forecast module 14 by passing the processed data sets through two software packages integrated into or accessible by the forecast module: the International Mathematics and Statistics Libraries (IMSL) (provided by Visual Numerics, Inc., see "Fortran 77 Stat/Library User's Guide," Vols. 1 and 2, Visual Numerics, Inc., 1350 pp. (1997), the entire content of which is hereby expressly incorporated herein by reference) and S-PLUS (provided by Mathsoft, Inc., see "S-PLUS 6.0 User's Guide" Data Analysis Division, MathSoft Inc., 540 pp. (2000), the entire content of which is hereby expressly incorporated herein by reference).

Initially, the IMSL is utilized to reduce the pool of potential predictors to a list of the best predictors. The ability of this program to process large data sets in a short period of time made IMSL an ideal software package for this aspect of the statistical processing. In IMSL, multiple linear regression, a process by which a predictand, Y, is fit by a linear combination of a set of predictors, Xi, is applied in the following manner:

$$Y \sim \beta_0 + \beta_1 X_1 + \beta_2 X_2 + \ldots + \beta_p X_p,$$

where Y is the desired binary threshold (e.g. the presence or absence of ceiling$\leq$1000 ft) at the desired location and "~" represents a numerically modeled fit using a set of coefficients, $\beta_i$ (for i=1, . . . ,p). The value of each coefficient (in addition to an equation intercept, $\beta_0$) is computed so as to minimize the squared sum of the residuals. Residuals are the errors, or differences, that naturally arise between the modeled values of the predictand and its true, or observed, values.

A stepwise regression technique is used in IMSL in order to obtain an optimal set of predictors. Stepwise regression is similar to a forward selection procedure in that a predictor is chosen based on its ability to independently produce the largest reduction of the residual sum of squares. However, unlike forward regression, the stepwise regression then employs a backward regression when a new predictor is added to the subset, in which partial correlations are calculated to determine if any of the previously selected predictors in the subset are no longer contributing significantly to the modeled fit. If a previously selected predictor is considered insignificant, the stepwise regression eliminates it from the model.

Unless cutoffs are imposed, stepwise regression will continue to select predictors until there are no more predictors available. One benefit of using IMSL in statistical development is that the program allows the user to input a threshold number (e.g., via the at least one input device 22) for the F-test significance level (p-value) as a criterion for examining additional predictors. By doing this, the user can control the total number of predictors selected in order to avoid the inclusion of predictors that are only meaningful to the developmental data set, i.e., to avoid "overfitting". In many instances, overfitting results in a degradation of the equation's performance when applied to the independent data set. However, the threshold number can be set or determined by the forecast module 14. In one embodiment, the p-value threshold is dependent on the ratio of the number of observations to the number of potential predictors; e.g., the larger the ratio, the larger the p-value applied. Thus, in most cases, only meaningful predictors are included in the final set of predictors, but the actual number of predictors is not controlled. However, in some instances, this p-value threshold still allows predictors with negligible predictive power (determined by very slight increases in the R-squared value) to remain in the final list of predictors, so an F-value threshold can be used in combination with the p-value threshold to reduce the number of predictors to a more reasonable number.

In one embodiment, the F-value threshold is also dependent on the observations to predictors ratio. For example, a ratio of fifty corresponded to a minimum p-value threshold of 0.010 and a minimum F-value threshold of fifteen. Additional trial and error can be applied to these thresholds as necessary.

Once the pool of potential predictors is reduced to the set of best predictors by IMSL, the software package S-PLUS is then utilized to develop the forecast equations. Because the predictands can be represented by binary variables (e.g., 0 if ceiling$\geq$1000 ft., 1 if ceiling<1000 ft.), logistic regression can be used instead of multiple linear regression. By using logistic regression, the forecast predictand values do not fall outside of the zero to one probability range. This logistic model assumes the following fit:

$$Y \sim 1/[1+\exp[-(\beta_0+\beta_1 x_1 + \ldots + \beta_p x_p)]].$$

Logistic regression can reduce forecast error more than multiple linear regression because it can fit each predictor in a non-linear way to the predictand. Moreover, a logistic fit automatically allows forecast predictand values to be constrained within the standard zero to one probability range whereas multiple linear regression does not.

For predictands, several thresholds of ceiling and visibility can be used in developing probabilistic forecast equations. For example, as shown in the table of FIG. 2, the thresholds can be based upon the upper-limit of several FAA flight rules in use operationally. The ceiling and visibility predictands are translated into binary variables based on the threshold, such that if the observed ceiling or visibility satisfied the threshold, a value of "1" is assigned as the predictand. Otherwise, a value of "0" is assigned as the predictand. In other words, a predictand is set to "1" if the observation satisfies the binary threshold; otherwise the predictand is set to "0".

In one embodiment, the ceiling and visibility observations at each observing site within the predetermined area of a desired destinations serve as predictands. For example, if one equation is developed for all hours of the day, observations of ceiling and visibility at all hours provided the predictand data. For predictors, the observational data for all sites within the domain are initially considered for the pool of potential predictors in the forecast equation development. However, introducing a large number of predictors (for any given hour) into the statistical program could overwhelm the system and also allow for the possibility of false relationships between predictand and predictors. Therefore, this pool of potential predictors are preferably reduced to a number that would not significantly sacrifice forecast accuracy.

In one embodiment, to obtain a reduced set of predictors that affect ceiling and visibility, each predictor in a set of potential predictors, such as the exemplary set shown in the table of FIG. 3 (which comprises by way of example twenty-seven observational terms in either binary or continuous format) is assigned either a "0" or "1" based on the absence or presence of that condition, whereas a continuous predictor simply equaled the observational value. In other words, a predictor is set equal to "1" if the observation satisfies the binary threshold; otherwise, the predictor is set to "0". If no binary threshold is listed, then the predictor is set equal to the observation value (i.e., a continuous predictor). Also, preferably two classes of predictors are developed. One class comprises the observational terms at the forecasting site and its nearest neighbors. The other class comprises smoothed observational values for all non-predictand variables, calculated by averaging the observational value at the forecasting site and its nearest neighbors. Further, observational data from previous hours can be included in case they contain any additional predictive information.

For the example, the twenty observational terms shown in FIG. 3 for each desired destination site and its nearest neighbors (e.g., its twenty-five nearest neighbors) can be considered considered. In addition, the smoothed observational terms derived from observations at the desired destination site and its nearest neighbors (e.g., ten nearest neighbors) can also be considered, as well as the observations from the six hours prior to initialization. Generally, predictor observations from the ten nearest stations to the forecast site are optimal. Also, the most recent observation (i.e., the observation at the initialization time) of the predictand variable at the forecast site and its nearest neighbors offer the most predictive information. Some additional accuracy can be gained by offering each of the observational predictors in FIG. 3 at the desired destination site as well as those in the spatially smoothed format. Little additional accuracy is gained by the inclusion of observations of the predictand variable at hours prior to initialization, at both the desired destination site and the nearest neighbors. Also, little additional accuracy is gained by considering multiplicative predictors or variable trends over previous hours.

Therefore, the reduced pool of predictors preferably include observations of the predictand (e.g., the ceiling or visibility threshold) at the desired destination site and the ten nearest neighbors as well as the observations of the predictor terms in FIG. 3 from the desired destination site as well as the spatially smoothed values of these predictor terms. In addition, several climatic terms can also be included in the final list of potential predictors, such as for example the sine and cosine of the day of year along with the climatology of the predictand variable at the forecast site, as shown in the table of FIG. 4. Preferably, these pridctors are set equal to the observational value (i.e., a continuous predictor). The reduced pool of predictors can then processed by ISML to produce the set of best predictors.

For high-frequency observations as predictors, the inclusion of the high-frequency observations generally requires additional consideration in order to maintain a manageable pool of predictors. To include the same predictors discussed above from each five-minute observation over the previous hour would overwhelm the statistical program formulating the equations, similar to that discussed previously. Therefore, the information provided by these five-minute observations are preferably condensed into fewer, but equally valuable, terms.

Taking the most recent observation of ceiling or visibility (again, depending on the predictand) at the desired destination site and nearest neighbors by way of example, the ceiling and visibility "statistics" are calculated for trend, standard deviation and fraction of observations below a given threshold. The trend statistic indicates whether the ceiling or visibility is improving, worsening, or remaining constant during a specified time interval. The standard deviation statistic identifies whether the ceiling or visibility is highly variable or relatively constant. The fraction of observations below a given threshold statistic pinpoints the predominant condition during the specified time interval. These statistics are preferably computed for the fifteen, thirty and sixty minutes prior to the most recent five-minute observation (such as shown for example in the table of FIG. 5).

The availability of these high frequency observation statistics as potential predictors allows for not only forecasts made at intervals shorter than 60 minutes but also the possibility of improved hourly forecasts. Therefore, when developing forecasts equations for lead times of one hour, the high-frequency observation statistics are preferably made available in addition to the data provided by standard hourly observations. Meanwhile, when developing forecast equations for lead times of less than one hour, preferably only information from the high-frequency observations is used, such as for example the most recent observation at the forecast site, the most recent predictand value at the other sites, smoothed values from the most recent five-minute observations and the statistics.

To provide the optimal guidance for ceiling and visibility, forecast equations are preferably developed for each hour of the day. Unfortunately, an undersized data set may result in too few cases and even fewer events and, most importantly, an insufficient ratio of cases to potential predictors for reliable statistical equation development. Therefore, a single forecast equation can be computed for all hours of the day at each forecast site rather than for each hour of the day, even though it is intuitive that the mechanisms for the development of low ceiling and visibility may be different at various times of the day. As a result, only a single equation could be developed for all hours of the day at each site. This shortcoming can be alleviated by use of a larger database. However, it is preferred that for each site in the desired area, unique equations be created for every combination of predictand, initialization time and lead time.

All forecast equations are preferably developed independently of one another, allowing each regression formula to contain its own assortment of predictors. Also, because the need to initialize a one-hour forecast can arise at any time (not just at the top of each hour), additional predictability can be obtained by using high-frequency observations is to make forecasts between hourly observations. Therefore, forecast equations with lead times of one can be initialized at the top of the hour, and at fifteen, thirty and forty-five minutes past the hour. Note that at fifteen minutes past the hour, the most recent hourly observations are fifteen minutes old when a one-hour forecast is initialized. The high-frequency observations can be used to obtain the predictand value at the appropriate time. When making forecasts with lead times of less than one-hour, the high-frequency observations become increasingly more valuable than hourly observations as the forecast initialization time deviates from the top of the hour. Moreover, as new high-frequency observations become available, the system 10 utilizing these observations can update its most recent forecast.

For example, if the system 10 makes a one hour forecast at 1800 UTC for 1900 UTC, when the 1805 UTC observation becomes available, the system should make a fifty-five minute forecast for 1900 UTC. As each new observation becomes available, the forecast should be updated until it reaches a five-minute forecast. Therefore, the system 10 can be adapted to rapidly update and provide for lead times ranging from five minutes to fifty-five minutes.

Therefore, it can be seen, using a statistical, probabilistic technique and high frequency observations allows for the forecasting system to be easily automated and updated continuously. Also, such an approach allows for lead times of one hour, as well as in a range of five to fifty-five minutes, and allows for initialization at multiple times, such as for example at the top of the hour and at fifteen, thirty and forty-five minutes past the hour. Preferably, unique forecast equations for each hour of the day, with varying lead times, are generated for each desired destination. In one embodiment, high-frequency observations are used in conjunction with the hourly observations to develop statistical forecast equations with lead times of 1-h which are initialized at the top of the hour as well as at 15, 30 and 45 minutes past the hour. In another embodiment, high-frequency observations are used to develop statistical forecast equation which are initialized every 5 minutes based on the most recent observations, with lead times ranging from 5 to 55 minutes so as to provide for more continuous, rapidly-updating forecasting. Also, as new observational data becomes available, new probabilistic forecasts are preferably generated.

While the forecast module 14 preferably utilizes an observations-based statistical technique wherein surface observations are used as predictors, it should be understood that other modeling techniques currently known in the art or later developed can be used in accordance with the present invention. For example, numerical models such as persistence, persistence climatology and Model Output Statistics (MOS) can be used for short-term predictions of ceiling and visibility. For example, as shown by J. P. Dallavalle and V. J. Dagostaro in "The accuracy of ceiling and visibility forecasts produced by the National Weather Service," Preprints, Sixth Conf. on Probability and Statistics in the Atmospheric Sciences, Toronto, ON, Canada, Amer. Meteor. Soc., 201-206 (1995), the entire content of which is hereby expressly incorporated herein by reference, simple persistence forecasts are highly competitive with subjective NWS categorical forecasts of ceiling and visibility at short-range lead times. However, Vislocky and Fritsch demonstrated that a statistical forecasting system has superior skill to persistence, as well as to persistence climatology and MOS for the short-term prediction of ceiling and visibility out to a lead time of 6 h.

Also, the present invention contemplates that the forecast module 14 can be adapted to receive input from human forecasters. For example, a human forecaster can produce a forecast indicating their degree of confidence that weather at the airport would be below minimums, as demonstrated by R. Keith (a co-inventor of the present invention) in "Optimization of value of aerodrome forecasts," Wea. Forecasting. 18, 808-824 (2003), the entire content of which is hereby expressly incorporated herein by reference. The human forecasts could then be inputted into the forecast module 14. However, it is important to note that human forecasters produce aerodrome forecasts that generally cannot match even raw persistence out to between 3 to 6 hours ahead (depending on how this forecast skill is measured).

As such, the forecast module 14 of the present invention preferably utilizes a statistical forecasting technique. Statistical guidance is also preferred in an application involving the aviation industry since it is a decision industry that needs reliable unbiased guidance to operate at peak efficiency. Bias can be introduced by human forecasters that use previous experiences, model knowledge, etc., to "correct" model guidance. Also, uncertainties can be captured using reliable probabilistic forecast guidance because it identifies the likelihood that a prediction will be correct and it provides an accurate measure of uncertainty (which corrects for bias).

The threshold module 16 of the system 10 generates the optimal threshold probability. The determination of optimal threshold for each flight preferably follows the techniques described by Keith (as referenced above).

Figures 6, 8:
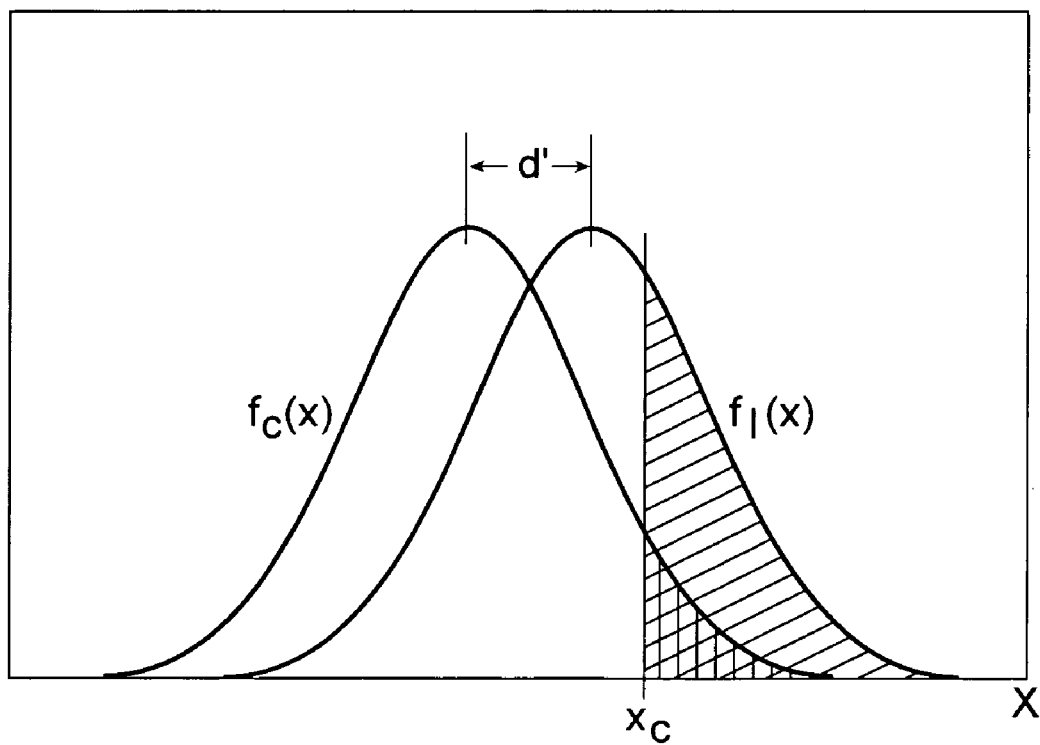
FIG. 6 shows a 2×2 contingency table of event forecasts and outcomes.
FIG. 8 shows a graphical representation of the idealized probability distributions of a decision variable $\chi$, $f_0(x)$ preceding nonoccurrence, and $f_1(x)$ preceding occurrence of the predictand. $\chi_c$ represents the decision criterion, the area marked by vertical hatching indicates the probability of a false alarm and the area of diagonal hatching represents the probability of a hit.

In any forced choice, binary outcome (yes-no) forecast situation, the outcome can be summarized by a traditional 2×2 contingency, such as shown for example in the table of FIG. 6. The outcomes, for the sake of intuitive understanding, are described as true positives (hits), true negatives (correct rejections), false negatives (misses), and false positives (false alarms).

Figure 7:
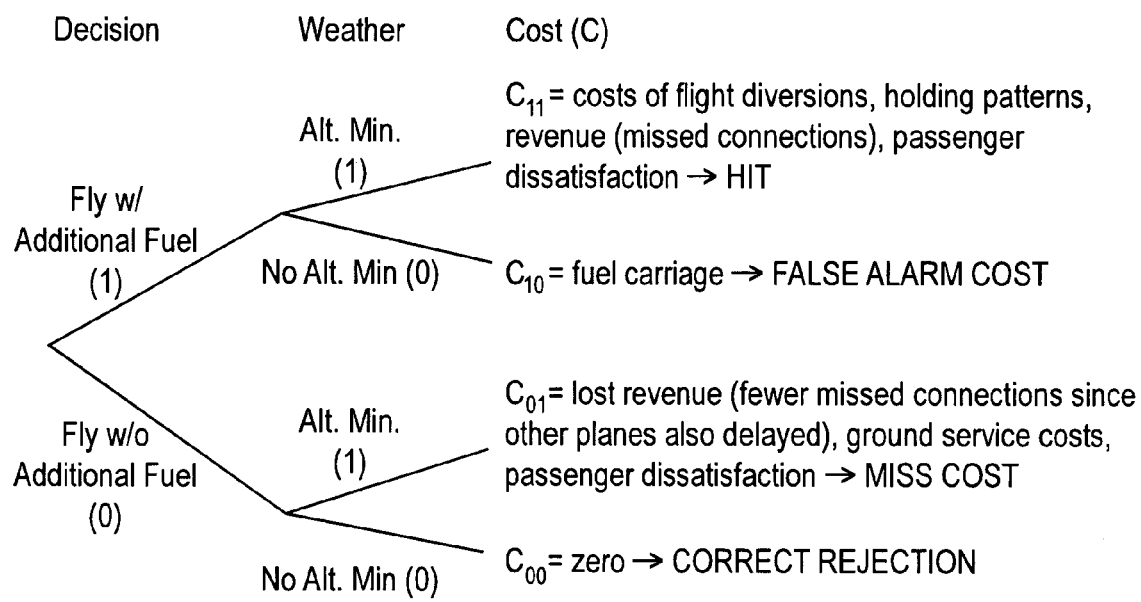
FIG. 7 shows a contingency tree for the relationship between decisions, weather forecasts, and costs.

When considering the possible effects of a probabilistic TAF of the present invention for any flight in terms of outcomes, a hit would be associated with the condition that the aircraft carries alternate fuel and must divert due to the weather. A false alarm would be associated with the condition where the aircraft carries fuel unnecessarily. A miss would be associated with the condition where the aircraft did not carry extra fuel and needed to divert en-route. A correct rejection would be associated where there was a correct forecast of good weather, resulting in no cost to the airline. As such, the significant weather-related aviation costs are those related to false alarm costs, which includes the cost to carry additional fuel unnecessarily on-board the aircraft, and those related to miss costs, which includes the cost of a missed event over and above the cost of a correct forecast of the event (i.e, the cost of the missed event that should be avoidable if the forecast was perfect). The miss costs includes cost of an en-route diversion, and the cost of a diversion from the desired destination after an attempted landing at the desired destination. The decision to fly with or without additional fuel and its relationship to costs is illustrated further in FIG. 7.

Signal detection theory (SDT) model of forecasts for TAFs can be used to ascertain whether the data can be fitted to the Gaussian model, as used by I. M. Mason in "A model for assessment of weather forecasts," Aust. Meteor. Mag., 30, 291-303 (1982), the entire content of which is hereby expressly incorporated herein by reference. Studies, most notably Mason (reference above), have shown that probabilistic forecasts of elements like rain, storms, and temperature closely fit the SDT model. SDT can be used to model the effect of decision thresholds on accuracy. It provides a measure of a acuity, or the ability to discriminate between two signals, one just noise, and one noise plus signal.

The linchpin of SDT is the assumption that, prior to a decision, there are two overlapping probability distributions: the weight of evidence for the event occurring, and weight of evidence against the event occurring. This is illustrated in FIG. 8, with $f_1(x)$ representing the evidence for the event, and $f_0(x)$ the evidence against. The y axis is the weight of evidence, the x axis shows values of $\chi$, the decision threshold. The area under the probability distribution for $f_1(x)$ to the right of $\chi_c$, the critical decision threshold, is the probability of a hit (hit rate). Similarly, the area under the $f_0(x)$ curve to the right of $\chi_c$ is the probability of a false alarm (false alarm rate). If the critical decision threshold $\chi_c$ decreases or moves to the left, both the hit rate and false alarm rate increase. Conversely, if the $\chi_c$ increases the false alarm rate decreases, but so too does the hit rate. Note that the separation of the means of the two distributions is denoted as d'. This parameter can be used as an index of skill as it defines the intrinsic ability to discriminate between the two distributions.

The form of the distributions in FIG. 8 is assumed to be Gaussian. The Gaussian assumption convenient in that the calculations fall out nicely. The formal definition of hit rate, h, is Pr(Forecast=Yes|Event=Yes), that is, the probability that the event is forecast given that it happens. This is the same as the probability of detection (POD) as widely used in meteorology. Similarly false alarm rate, f, is Pr(Forecast=Yes|Event=No), that is, the probability that the event is forecast given that the event does not happen. Note that f is different from FAR, the false alarm ratio, a term encountered in meteorology and often confused with f. FAR in fact is Pr(Event=No|Forecast=Yes).

In the Gaussian distribution of the signal detection model in FIG. 8, h and f can be expressed in terms of the location of the decision threshold, $\chi_c$, on the x axis of the overlapping normal distributions. A more expansive treatment of this can be seen in McMillan, N. A., and C. D. Creelman, "Detection Theory: A User's Guide," Cambridge University Press, 407 pp. (1991); Swets, J. A., "Indices of discrimination or diagnostic accuracy," Psychol. Bull., 99, 100-117 (1986), or Mason (referenced above); the entire contents of which are hereby expressly incorporated herein by reference.

The likelihood ratio is defined as $\beta=f_1(x_c)/f_0(x_c)$. If the mean of $f_0$ is set to zero, the mean of $f_1$ becomes d', the separation of the means. If the variances of the two distributions are assumed to be equal, one can connect $\chi_c$ and d' as follows. From the formula of the normal distribution, $$\beta = \exp[-0.5(\chi_c - d')^2]/\exp(-0.5\chi_c^2) \text{ and}$$

$$2\ln\beta = 2\chi_c d' - d'^2, \text{ so } \chi_c = \ln\beta/d' + d'/2.$$

As seen in Mason (referenced above), the likelihood ratio $\beta$ can be expressed through Bayes's theorem as a ratio of the odds of the probabilities of the event at $\chi = \chi_c$, p, to the odds of the climatological probability, $p_c$:

$$\beta = [p/(1-p)]/p_c/(1-p_c)].$$

A link is thus available from forecast probability to hit rates and false alarm rates, using as variables $p_c$ and d'. Again assuming equal variances of the two distributions, d' can readily be calculated from the data in the standard 2×2 contingency table of FIG. 6. Here, d' is just the difference between the normal deviates of h and f As h is an estimate of Pr(Forecast=Yes|Event=Yes), h=d/(d=b), and similarly f=c/(c+a). The normal deviates of these can be calculated and subtracted to yield d'. The degree of validity of the assumption of equal variances is discussed further below.

In "The application of signal detection theory to weather forecasting behavior," Mon. Wea. Rev., 120, 863-883 (1992), the entire content of which is hereby expressly incorporated herein by reference, Harvey et al. developed a relationship for expected value of a forecast, using the four conditional probabilities from the contingency table, and the value of each of the outcomes. They arrive at a relationship for the expected value (EV) of a forecast. Substituting terminology used in the present invention for their terminology, the relationship is $$Ev = hp_c V_{TP} + (1-p_c)fV_{FP} + p_c(1-h)V_{FN} + (1-p_c)(1-f)V_{TN}, \quad (1)$$

where $p_c$ is the climatological rate of occurrence of the event, or Pr(Event=Yes), the Bayesian prior probability; h is hit rate; f is false alarm rate; and $V_{TN}$ is the value of a true negative, $V_{FN}$ the value of a false negative, $V_{FP}$ the value of a false positive, and $V_{TP}$ the value of a true positive. Both $V_{FN}$ and $V_{FP}$ have negative values and are better called costs.

By using the fact that perfect forecasts have h=1 and f=0, equation (1) can be simplified to provide an expression for the expected cost of an imperfect forecast with respect to a perfect forecast:

$$\text{expected cost} = (1-p_c)f(V_{TN} - V_{FP}) + p_c(1-h)(V_{TP} - V_{FN}).$$

By defining $(V_{TN} - V_{FP})$ as the false alarm cost, the cost of incorrectly forecasting an event, and $(V_{TP} - V_{FN})$ as the miss cost, the cost of not forecasting an event, and making this substitution, $$\text{expected cost} = (1-p_c)f(\text{false alarm cost}) + p_c(1-h)(\text{miss cost}). \quad (2)$$

Note that by definition, miss cost does not include any costs already incurred by a hit, or correct forecast of an event. In the context of a TAF, an aircraft may not be able to land regardless of whether the bad weather was or was not forecast. The miss cost is only that cost attributable to the event not being forecast over and above the cost accrued if it had been correctly forecast. False alarm cost is easier to ascribe, as there is no weather-related cost attributable to a correct rejection, and it is thus the cost of protective action. In the TAF situation, this would be the cost to carry extra fuel and perhaps lost payload.

If equation (2) is differentiated with respect to p, the forecast probability, and the result set equal to 0, the value of p(opt), the value of the optimal forecast probability that minimizes the expected cost (i.e., the optimal balance between misses and false alarms), is defined as:

$$p(\text{opt}) = CR/(1+CR), \quad (3)$$

where CR is the cost ratio and equals the false alarm cost divided by the miss cost.

Derivation of equation (3) goes as follows: differentiating equation (2) with respect top and setting the result to zero gives $$(1-p_c)\cdot(df/dp)CR - p_c(dh/dp) = 0, \text{ so}$$

$$dh/df = CR(1-p_c)/p_c.$$

It has been shown (e.g., by Green, D. M., and J. A. Swets, "Signal Detection Theory and Psychophysics," Robert E. Kreiger Publishing, 479 pp. (1974), the entire content of which is hereby expressly incorporated herein by reference) that dh/df (the slope of the ROC), is the same as the likelihood ratio, $\beta$, at the corresponding value of $\chi_c$. Substituting $[\beta/(p/(1-p)]$ for $(1-p_c)/p_c$ gives $$p = p(\text{opt}) = CR/(1+CR).$$

So, as one would logically expect, the optimum decision threshold is a function of the costs of the outcomes only. For a particular flight, the magnitude of the expected cost will be determined by skill and $p_c$, but for a given skill and $p_c$ the minimum value of expected cost will be at p=p(opt).

Referring again to FIG. 7, the decision tree shown therein illustrates the decision to carry additional fuel and the relationship to cost. The decision to fly with additional fuel is assigned a binary "1", and the decision to fly without additional fuel is assigned a binary "0". A weather forecast where the alternate minimum is present is assigned a binary "1", and a weather forecast where there is no alternate minimum is assigned a binary "0". As a result, there are a four possible cost outcomes. The hit cost is identified therein as $C_{11}$, the false alarm cost is identified as $C_{10}$, the miss cost is identified as $C_{01}$, and the correct rejection cost is identified as $C_{00}$. Again, the optimal decision probability which minimizes the cost impact of errors in the forecast is the optimal balance between miss cost and false alarm cost. Defining p as the probability that there will be adverse conditions, and (1-p) as the probability of no adverse conditions, for the "extra fuel" decision option, the expected cost (EC) is:

$$EC_1 = p^*C_{11} + (1-p)^*C_{10}, \text{ and}$$

for the "no extra fuel" decision option, $$EC_0 = p^*C_{01} + (1-p)^*C_{00}.$$

The logical decision then is to carry extra fuel if the expected costs from carriage ($EC_1$) are less than that from not carrying extra fuel ($EC_0$), e.g., $EC_1 < EC_0$. Substituting for $EC_1$ and $EC_0$ and then solving for the optimal probability, p(opt):

$$p(\text{opt}) = CR/(1+CR).$$

Operating costs, from which miss cost and false alarm cost can be determined, for every flight route for airline is generally predetermined and substantially fixed. As such, the threshold module 16 of the system 10 preferably has access to a database (not shown) containing such information to calculate optimal probabilities. The database can be local or remote to the computer system 12.

It should be noted that the important for airlines to accurately specify the miss cost and false alarm cost for every flight. While some flights may require simple, single-point decisions, others are more complex and have multiple possible alternate destinations and PNR decisions. For example of the possible complications is a flight from Tokyo to Perth, Australia, operated by Qantas with a Boeing 767 (B767). This flight is near the limit of endurance for a B767. If the Perth TAF has an alternate requirement and the flight is carrying a full payload, the pilot must land at Darwin to take on extra fuel. So the false alarm cost increases dramatically due to payload considerations. The effect is to raise p(opt) from 0.02 to around 0.20, an order of magnitude greater. Therefore, considerable effort would be required by airlines to specify the full suite of costs associated with the various flights performed by the airlines.

One embodiment of calculating the false alarm cost and miss cost is described herein using symbols for the dollar amounts. When a flight plan is done prior to a flight leaving, a TAF forecasts either alternate (ALT) conditions, INTER or TEMPO deteriorations in the weather, or good conditions above the alternate minima. For purposes of clarity of understanding, INTER and TEMPO forecasts are not discussed. However, the present invention contemplates that such factors can be considered.

If the TAF forecasts below alternate conditions, the aircraft takes on sufficient fuel to make an approach into the desired destination, and then to fly back to an alternate destination if the aircraft cannot land at the desired destination. For example, the alternate destination can be an airport near the desired destination. In a usual case, a pilot will usually make an approach into the desired destination knowing he or she has enough fuel to abort and fly back to alternate destination. If the TAF forecasts conditions above the alternate minima, the pilot usually flies on to the desired destination and lands. However if the weather at the desired destination is below the alternate minima when the flight reaches an intermediate location, such as a point on track abeam the alternate destination, the pilot will divert to the alternate destination.

The costs required in order to calculate the false alarm cost and miss cost are shown in table of FIG. 4. The false alarm cost is readily available from this information, being the "cost to carry" the extra diversion fuel of $C. Calculation of the miss cost is more complex. Remember that the miss cost is that cost caused by a diversion over and above that cost accrued if the below minimum weather was correctly forecast, that is, above the cost of a hit. The cost of a hit depends on whether the pilot can actually land at the desired destination when the weather is below the alternate minimum. If the pilot can land safely at the desired destination when the forecast is a hit, then there is no extra cost over the false alarm cost of $C. However if the pilot cannot land, then the aircraft must fly to the alternate destination, and return to the desired destination when able to land there. The cost of the diversion is $(C+H+E+F) minus $I for fuel that is not used.

Another consideration is what proportion of the time that the weather is below the alternate minimum can the pilot still land. Every airport has a level below the alternate minimum to which a pilot may descend, at which time he or she aborts if visual reference of the airstrip has not been attained. This level is called the instrument landing system (ILS) minimum.

Preferably, for a period of time (e.g., thirty years), synoptic observations are analyzed for the desired destination airport. For example, if it was found that of the number of occasions that the alternate minimum was breached, 28% of these also breached the ILS minimum (thus precluding landing. So the calculation), then the hit cost proceeds as:

$$\text{average hit cost} = (0.72 \times \$C) + [0.28 \times \$(C+H+E+F-I)]$$

and $$\text{average miss cost} = \$(C+H+E+F-I) - \text{average hit cost}.$$

The decision module 18 determines whether additional or alternate fuel is assigned to an aircraft for a particular flight. The decision module 18 receives the probability forecast from the forecast module 14 and the optical threshold probability from the threshold module 16. In one embodiment, the decision module 18 assigns alternate fuel whenever the probability forecast is greater than or equal to the optimal decision probability for the particular flight.

The decision module 18 outputs the decision whether to assign alternate fuel the flight so as to provide a probabilistic TAF. In one embodiment, the decision module 18 outputs the decision to the at one output device 20. The output device 20 displays the decision in a format perceivable by a human user. For example, if the at least one output device 20 is a monitor, then the decision can be displayed on the screen, or if the at least one output is a printer, the decision can be printed out as a hard copy. The decision module 18 can also provide decision to other devices in the form of a data file. For example, the decision can be provided to a remote computer system (not shown), such as a computer system used to control fuel orders so that information in the decision can be used to automatically update a fuel order for the flight.

EXAMPLE 1

In this example, results of an experiment involving groups of human forecasters at three different locations across Australia are presented. The forecasters were asked to indicate their degree of confidence that weather at the airport would be below "minimums" that would require aircraft to carry adequate fuel to proceed to an alternate destination should they not be able to land. Also, the potential value in reliable estimation of the probability of low visibility and cloud base at aerodromes is estimated by using cost parameters for two actual examples of flights into Melbourne and Townsville, Australia.

The forecasts provided by the human forecasters in this example follows the traditional method of providing weather information in TAFs in categorical form, that is, as a binary, yes-no product. Current rules do allow forecasters to use probabilities for some elements like thunderstorms and fog. For example they can say "PROB30" for the occurrence, which means a 30% chance of occurrence. However, airlines are generally obliged by regulations to carry the full fuel requirement equivalent to a forecast of 100% confidence. So the use of the PROB30 is redundant, and the forecast is effectively completely categorical. Forecasters often know this, and also have some concept of the consequences of missed events. They also adopt quite varying tactics, demonstrating a variety of attitudes to these consequences. Forecasters are also able to use temporal categorical variations to mean conditions when formulating TAFs. If the mean conditions are above the special lowest alternate minimum (SLAM), the term INTER (TEMPO) refers to periods of less than 30 (up to 60) min below the SLAM. Use of these modifiers can be interpreted as crude probabilistic forecasting.

In the experiment, forecasters at three Australian forecasting offices were asked to estimate their confidence, to the nearest 10%, that the weather at five different lead times will be below the SLAM for a particular aerodrome. The SLAM comprises values of cloud base and visibility, as well as weather type, and is the level used to determine fuel carriage for most passenger-carrying aircraft. The lead times are 1, 3, 6, 12, and 18 h. Forecasters formulated the probabilities at the same time they produced the routine issue of the TAF. Only routine issues of the TAF were tested. This was done so that the lead time-skill relationship was not skewed. Nonroutine amendments are usually issued to amend the TAF at short lead times, and so counting these would probably bias the skill in favor of the shorter lead times. The trial data were provided by forecasters at the Victorian Regional Forecasting Centre (Vic RFC), the Sydney Airport Meteorological Unit (SAMU), and the Townsville Meteorological Office (TVL). All forecasters were volunteers. Data have been accumulated at Townsville since December 1999, at Vic RFC since March 2000, and at SAMU from about April 2000. Data have been analyzed up to September 2001.

Differences in the forecast tactics between individual forecasters, and the effects of these differences on the financial outcome to airlines are demonstrated in this example.

Figure 9:
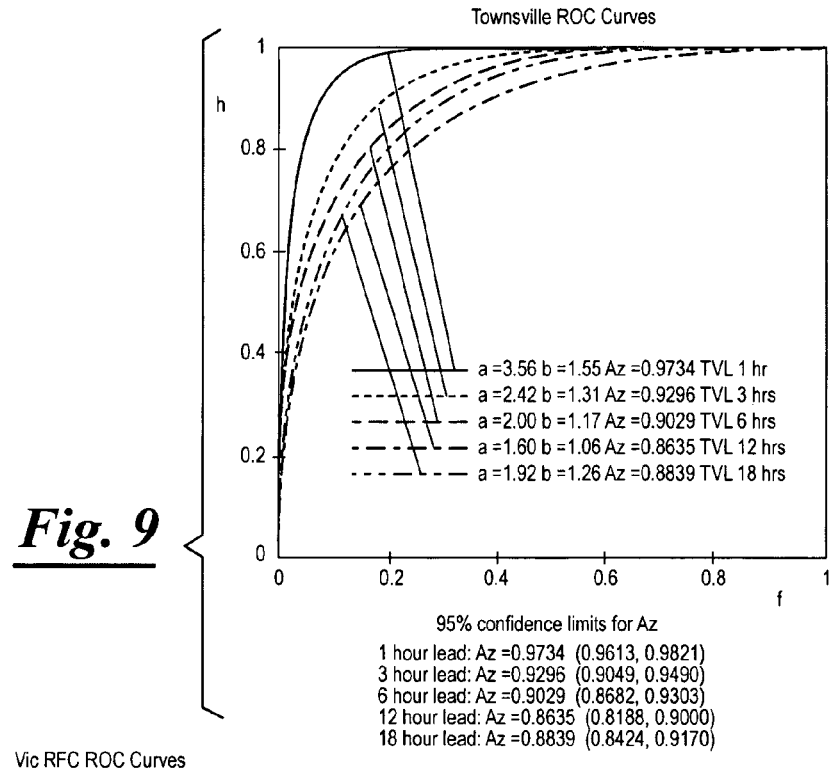
FIG. 9 shows exemplary relative operating characteristic (ROC) curves for Townsville Meteorological Office.
Figure 10:
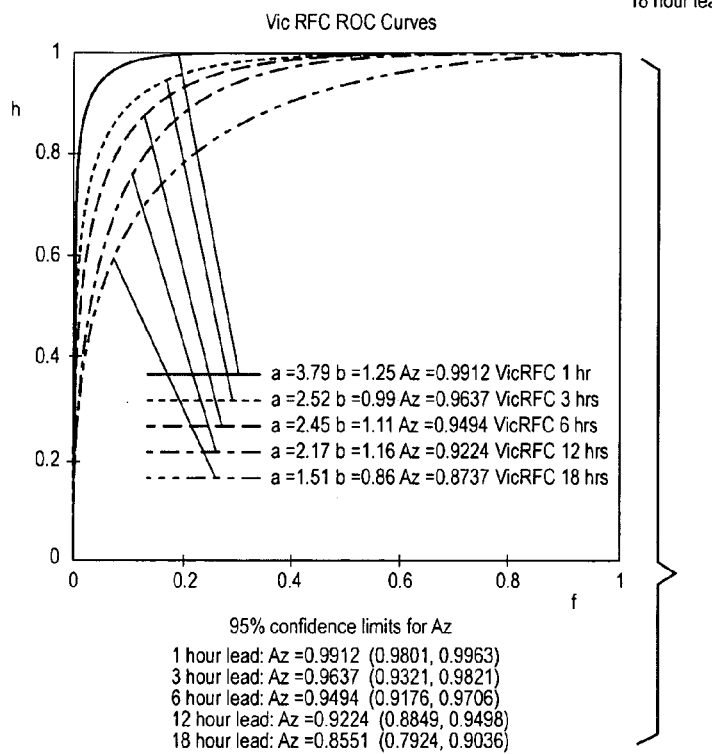
FIG. 10 shows exemplary ROC curves for Victorian Regional Forecasting Centre (Vic RFC).

In the experiment, forecasters were asked to indicate their confidence of below SLAM weather at each lead time to the nearest 10%, so that there are 11 different decision thresholds from 0% to 100%. The hit rate and false alarm rate can then be calculated for forecast probability greater than or equal to each of the 11 different decision thresholds. These are then plotted against one another to produce a relative operating characteristic (ROC). By way of example, the ROCs produced in this experiment are shown in FIGS. 9-11.

The diagonal on the ROC is the line h 5 f. On the diagonal a forecaster has the same chance of a hit as a false alarm, and so the diagonal is defined as zero skill. A perfect forecast is indicated by a ROC from (0,0) to (0,1) to (1,1). So a reasonable skill measure is the area under the ROC curve. Mason (referenced above) calls this $A_z$ once the Gaussian model is applied. Here, $A_z$ has been shown to be independent of the climatological rate of occurrence and also, most importantly, independent of the decision criterion xc (e.g., see Harvey et al., referenced above). These are advantages of the SDT summary measure $A_z$. The dependence of some traditional skill scores on decision thresholds is described in Swets, Mason, and Harvey et al. (referenced above).

$A_z$ is a measure of potential forecast performance. As is demonstrated herein, the economic value of the forecast depends on the decision criterion, $\chi_c$, as well as on the accuracy. As a measure of skill, $A_z$ qualifies as a strictly proper score. This means that it is not possible to optimize the score by hedging. Because conventional skill scores are, to varying degrees, dependent on decision threshold, a shrewd forecaster, after a little research and experimentation, could optimize his or her score by adopting a decision threshold that optimizes the particular score by which he or she is being assessed.

Figures 11, 12:
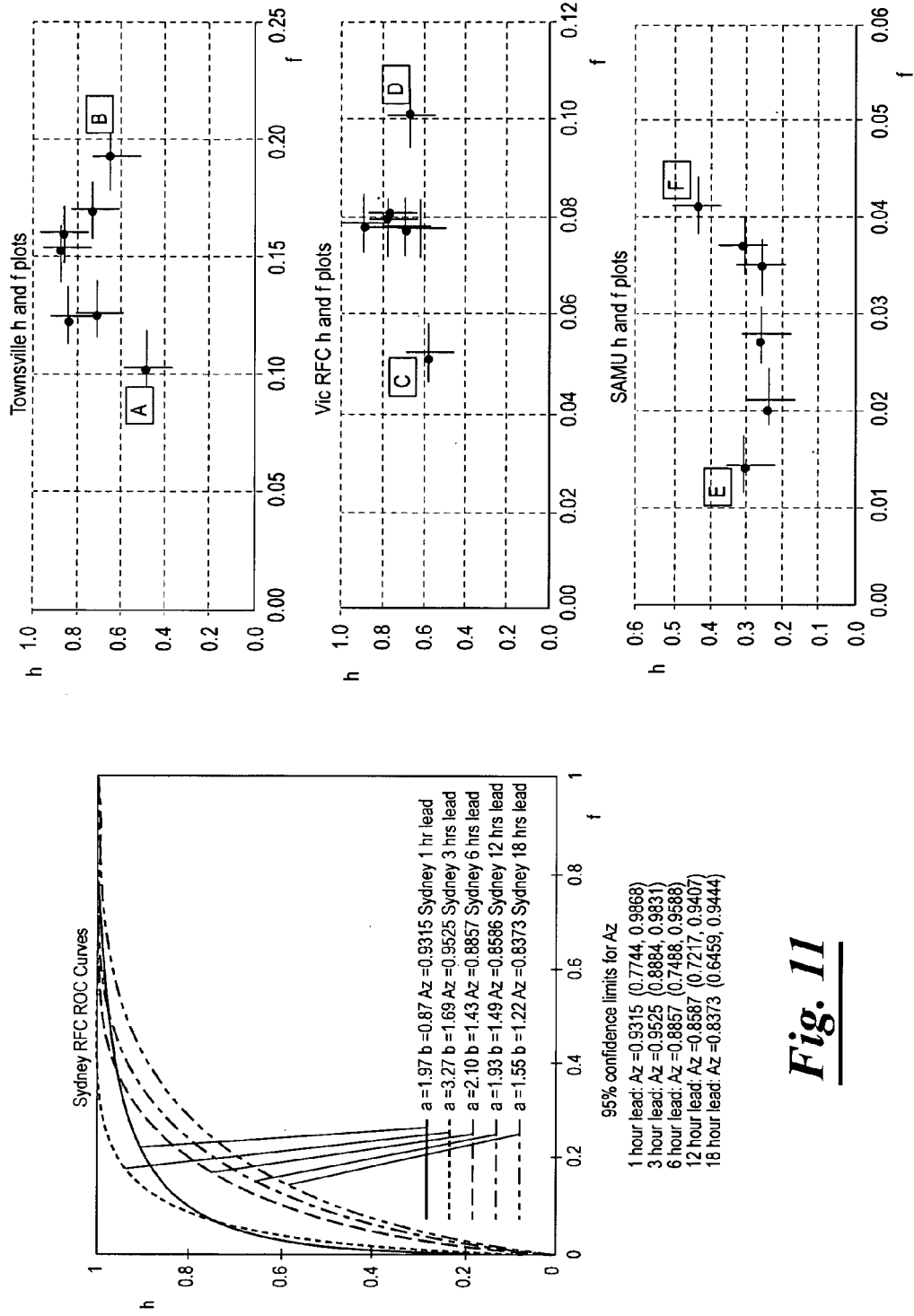
FIG. 11 shows exemplary ROC curves for Sydney Airport Meteorological Unit (SAMU).
FIG. 12 shows plots of hit rate vs. false alarm rate for exemplary individual forecasters at Townsville, Vic RFC, and SAMU. Error bars are 95% confidence intervals.

FIG. 12 shows plots of hit rate and false alarm rate for individual forecasters at Townsville, Vic RFC, and SAMU. These data are derived from the Bureau of Meteorology's automated TAF verification system and are based on three to four years of verification data. The data are different from the experiment in this example and were used in order to achieve better error statistics. They are shown merely to demonstrate the range of differences between individuals. The values of h and f shown are a composite of each whole hour of lead time up to six hours; 95% confidence limits are included. The confidence intervals can be calculated from the formula quoted in Stephenson, D. B., "Use of the 'odds ratio' for diagnosing forecast skill," Wea. Forecasting, 15, 221-232 (2000).

While most forecasters aggregate around particular regions in the graph, each plot shows forecasters with markedly different decision thresholds. In FIG. 12, forecasters A, C, and E show considerably less aversion to the risk of a miss than forecasters B, D, and F, respectively. For example, forecaster A has a smaller hit rate than B, and a much smaller false alarm rate. Therefore, A is operating at a higher decision threshold than B; that is, he or she is less cautious than B. The effect of the variation of the decision threshold on the cost outcome is described below.

In each set of data shown in FIG. 12, the difference in the decision threshold between the outliers is more marked than are differences in skill. This suggests that any difference in value may be caused more by variations in decision threshold than by differences in skill, keeping in mind the usual shape of a line of equal skill on a ROC. The section above on forecast value shows how minimizing the cost of the uncertainty in the forecast depends on using an optimal decision threshold.

Climatological rates of below SLAM events at most Australian airports are typically around 0.02. As such, there is not adequate data from the experiment in this example with which to carry out an analysis on individual forecasters. There are four entries daily for each TAF, and given that there can be up to eight or nine forecasters involved, there may be only 10 to 20 events for each forecaster for each lead time. To acquire enough data for analysis of individual forecasters would take several years. It is hoped to acquire enough of the probability forecasts over time at Townsville, where data acquisition continues, to enable ROC analysis on individuals. Nonetheless some conclusions can be made as to an individual's proclivity to forecast below SLAM weather more or less than others, simply by analyzing Pr(Forecast=Yes) for all confidence levels. This is irrespective of whether the event happened or not, and comparison assumes a reasonably constant frequency of occurrence among the group over the period. Only gross and obvious differences between individuals are discussed.

This analysis is shown for three forecasters at Townsville in FIG. 13, and for two forecasters at Vic RFC in FIG. 14. There were not enough events forecast at SAMU to enable such an analysis. At Townsville, ALT (alternate) is not forecast all that often, due to the climatology. Below minimum events are mostly precipitation induced and convective in nature so, unlike say fog, there are usually occasional breaks in the precipitation. So the analysis in FIG. 13 is confined to INTER and TEMPO forecasts. At Melbourne, however, most of the below SLAM weather is due to fog and low cloud, which tends to be persistent over a period of hours. Forecasts of TEMPO are not made very often because precipitation-induced events are usually brief. So the analysis in FIG. 14 is confined to INTER and ALT forecasts.

Data on the three individual forecasters from Townsville in FIG. 13 demonstrate considerable variation in their perceived confidence of below minimum conditions, and their inclination to forecast below minimum conditions. Each forecaster had issued well in excess of 200 forecasts. The total number of actual occurrences of below minimum conditions at all the target times is listed in the last column. Generally all three are less conservative at short lead times for both INTER and TEMPO forecasts; that is, the required confidence for the forecast of the event is higher at short lead times than longer lead times. Of interest is the large range of decision thresholds for forecaster C, especially for TEMPO forecasts, compared to the others. Both A and B rarely perceive a confidence greater than 50% at lead times greater than one-hour, whereas C for TEMPO forecasts exhibits a broad almost uniform spread of confidence across the whole range of probabilities. Forecaster C also tends to forecast TEMPO at a higher rate than the others, in line with his perceived confidence. By contrast, forecaster A is more inclined to forecast INTER conditions even though his perceived confidence is much the same, or even a little less, than the others. The clustering of the decision thresholds around certain percentages for forecasting INTER and TEMPO can also be interpreted as the forecasters using these temporal variations as de facto probabilities.

At Townsville, INTER forecasts cluster around 20%-30%, and TEMPO forecasts around 30%-40%. As forecasters are required to express the forecast in a categorical manner, above or below the airport minimum, they can express their confidence with INTER or TEMPO. For example, if forecaster C thinks there is a 30% chance of below minimum conditions 6 h ahead, he will generally forecast INTER conditions, but if he thinks there is 60% chance, he will generally forecast TEMPO. Discussions with Townsville forecasters generally revealed a strong tendency to forecast TEMPO if they thought thunderstorms or heavy showers would be frequent and widespread, and INTER if the thunderstorms would be isolated. Logically, if a forecaster thinks the poor weather could last up to 60 min, and so forecasts TEMPO, he or she believes there is more chance of below minimum conditions at a particular time than if he or she thinks the poor weather will last only up to 30 min; and forecasts INTER. So the temporal variations of INTER and TEMPO can also be interpreted as crude probability forecasts.

Referring now to FIG. 14 and the analysis for two forecasters at Vic RFC, there is a significant difference in the percentage confidence levels for forecasts of ALT between the two. One would expect the distribution for ALT forecasts to be bimodal. A forecast of a probability of 30% or 40% of fog or thunderstorms (phenomena that can preclude landing) is considered by the safety regulators as an alternate forecast. Forecaster A exhibits this bimodality, whereas the distribution for forecaster B is clustered about 50%. Forecaster B shows generally much higher probabilities for ALT forecasts. For both forecasters, the higher probabilities for ALT forecasts compared to INTER forecasts are very apparent.

The above discussion of the differences between forecasters is not meant to imply any specific effect on the economics of airline operations. The only purpose of this analysis is to demonstrate that there are obvious differences in the approach taken by different forecasters.

Referring to FIGS. 9-11, shown therein are the ROCs for Townsville, Vic RFC, and SAMU, respectively. These are maximum likelihood best fit curves based on the Gaussian model. They show $A_z$ values generally decreasing with lead time. Exceptions are two small and insignificant reversals, one at Townsville between 12- and 18-h lead time, and the other between 1 and 3 h at SAMU. Both reversals are within the 95% confidence limits. The ROCs in FIGS. 9-11 have 95% confidence limits for $A_z$. Also, a is the y intercept of the plot of normal deviates of h and f on binormal axes, and b is the slope of a best fit straight line of the plot of normal deviates. The ROCs for SAMU are based on a number of events insufficient to make firm conclusions about variation of skill with lead time. Data acquisition is continuing at SAMU. The 95% confidence limits for SAMU are very broad, and these ROCs are only presented for the sake of completeness. For Townsville and Vic RFC, however, it can be stated with reasonable confidence that skill decreases with lead time.

Figure 15:
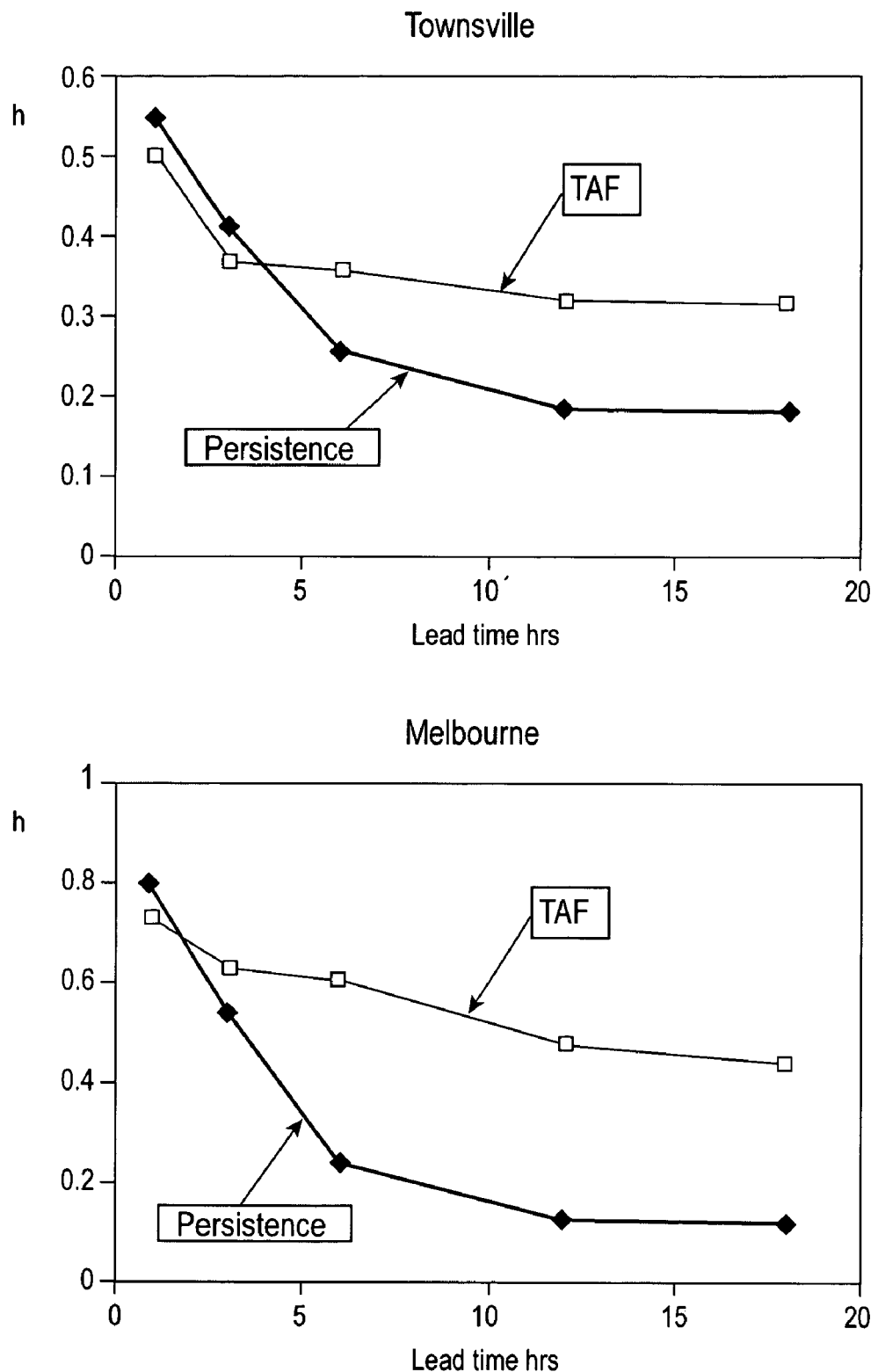
FIG. 15 shows plots of exemplary lead time vs. hit rate for Townsville and Melbourne.

FIG. 15 shows the relationship between hit rate and lead time for Townsville and Vic RFC (Melbourne) for both the forecasts and persistence. The hit rate for the forecast is calculated from the best fit ROC at the same false alarm rate calculated for persistence. The (h, j) pairs for persistence plot toward the bottom left of the ROCs, where the hit rate varies strongly with small changes in false alarm rate. Fixing the value of f thus enables a sensitive comparison of h. Persistence in this context means that if the initial conditions at the airport are below (above) the alternate minimum, the persistence forecast for all lead times is for below (above) the alternate minimum.

The persistence ratings on the ROCs for the Townsville and Melbourne data are interesting when compared to the findings by Harvey et al. (referenced above). Using the same method, Harvey et al. found that forecasts of convection at Stapleton International Airport, Denver, Colo., with lead times of 1 h and less failed to match persistence. The data in that study and the experiment in this example are quite similar. Both involve short-term forecasts at airports and both have operational significance to aircraft operations. The results of the two experiments suggest that forecasts at lead times of less than about 3 h cannot beat persistence. The performance at a lead time of 3 h at Townsville fails to match persistence. Forecast skill in the Tropics at all timescales is known to be inferior to that in higher latitudes. This is of course due to the sporadic nature of events. At Vic RFC the performance at the 3-h lead time is a little better than persistence.

Figure 16:
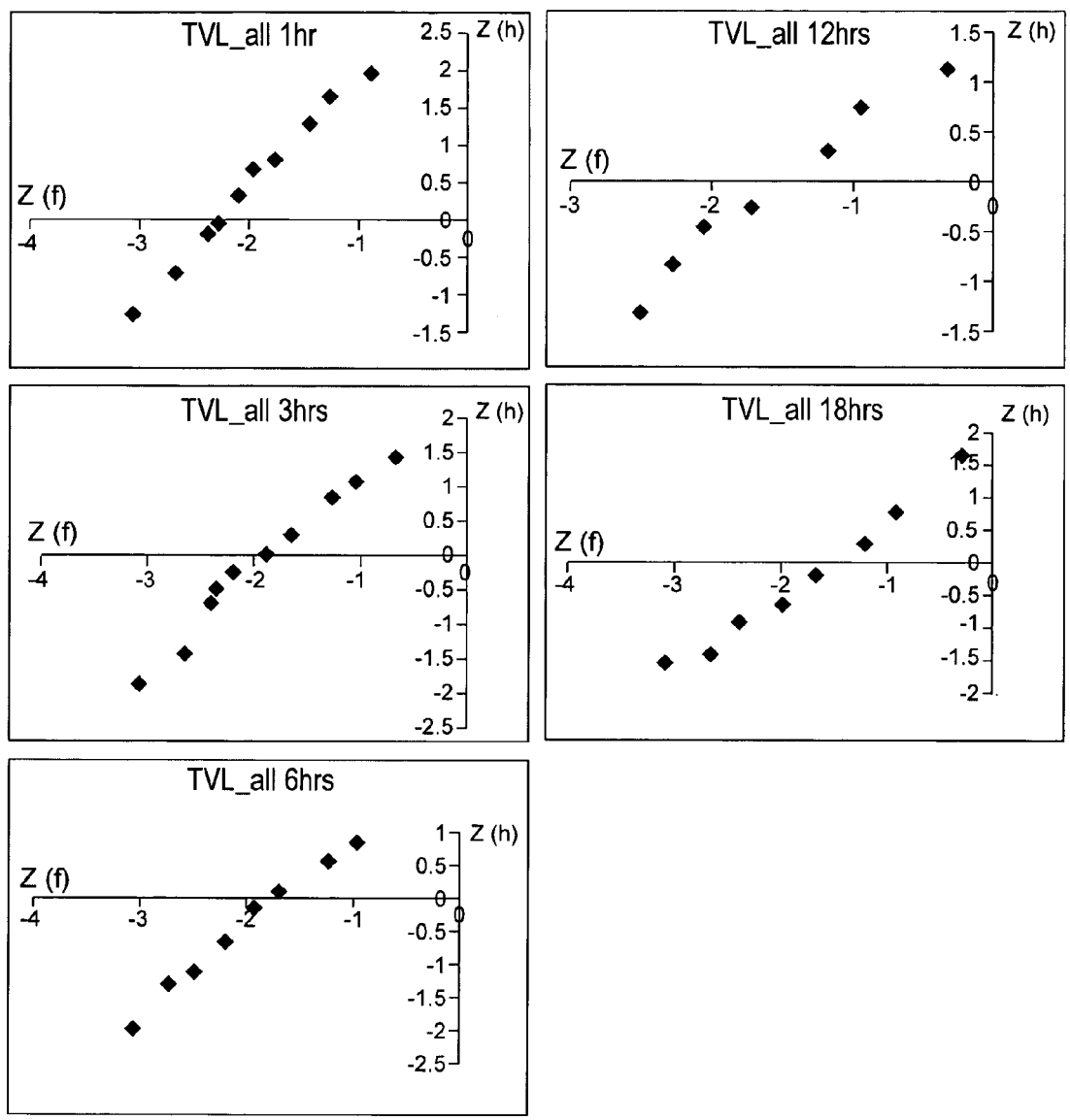
FIG. 16 shows plots of exemplary normal deviates of hit and false alarm rate for Townsville for a plurality of exemplary lead times.
Figure 17:
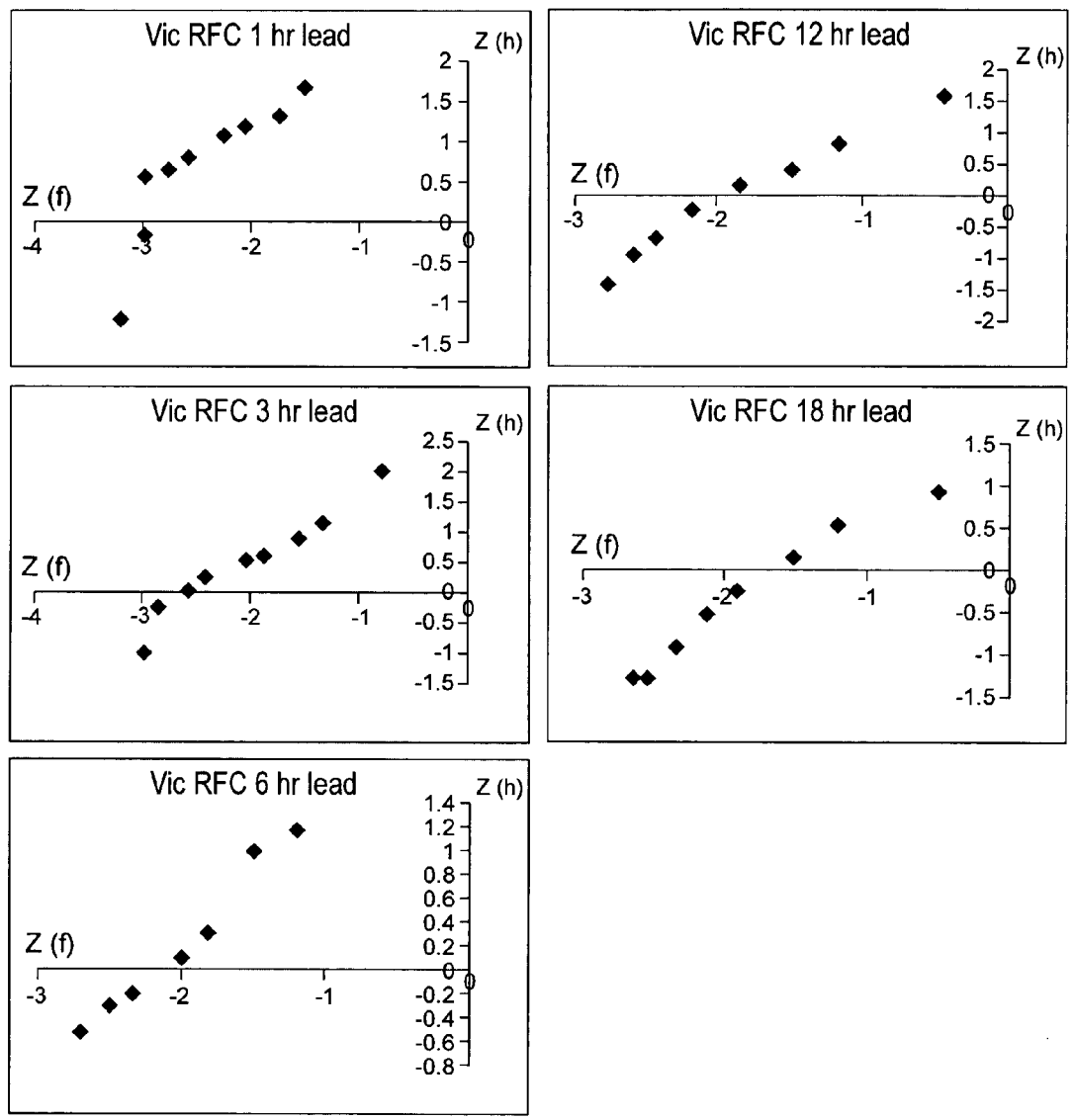
FIG. 17 shows plots of exemplary normal deviates of hit and false alarm rate for Vic RFC for a plurality of exemplary lead times.
Figure 18:
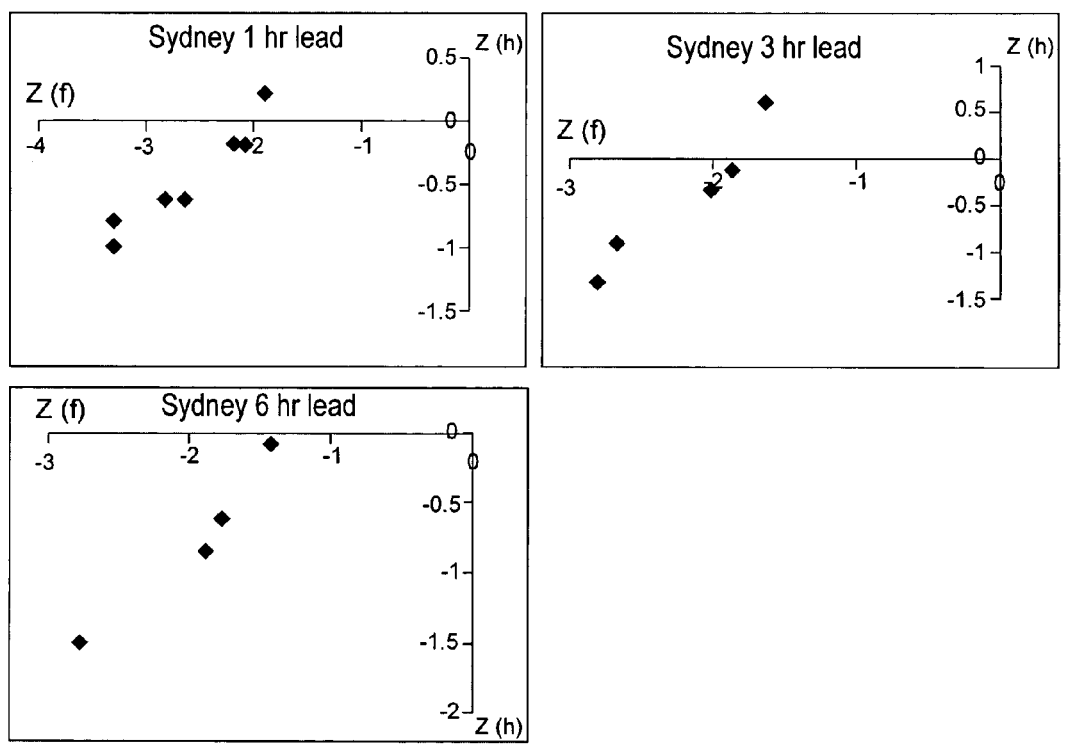
FIG. 18 shows plots of exemplary normal deviates of hit and false alarm rate for SAMU for a plurality of exemplary lead times.

FIGS. 16-18 are plots of the normal deviates of hit rate and false alarm rate, for each lead time, for Townsville, Vic RFC, and SAMU. Note that there is no plot for SAMU for 12- and 18-h lead times. Due to the rare nature of the events at Sydney, there were very few high confidence estimates at the longer lead times. Each point on the graphs is the value of the normal deviates of an (h, f) pair at a different decision threshold. The degree of linearity of these plots is a measure of the validity of the assumption of normality of the original distributions of hit rate and false alarm rate. Further, it can be shown (e.g., see Green and Swets, referenced above) that the slope of the plot of normal deviates of h and f is equal to the ratio of the standard deviations of the two distributions for and against the event. The proximity of this slope to unity gives a measure of the appropriateness of using d' as a measure of accuracy. Values of the slope are given as b in the legend of FIGS. 9-11. As can be seen, the slope is between 0.99 and 1.31 for Townsville and Vic RFC for lead times of 3, 6, and 12 h. These lead times cover the period that is generally the most important for aviation operations. Use of d9 is computationally easier and more pleasing than using $A_z$, which is a more robust measure of accuracy. It is not intended that the cost results derived using d' be used as an exact figure, but more as a neat illustration of the relative benefit of using probabilistic TAFs.

Figure 19:
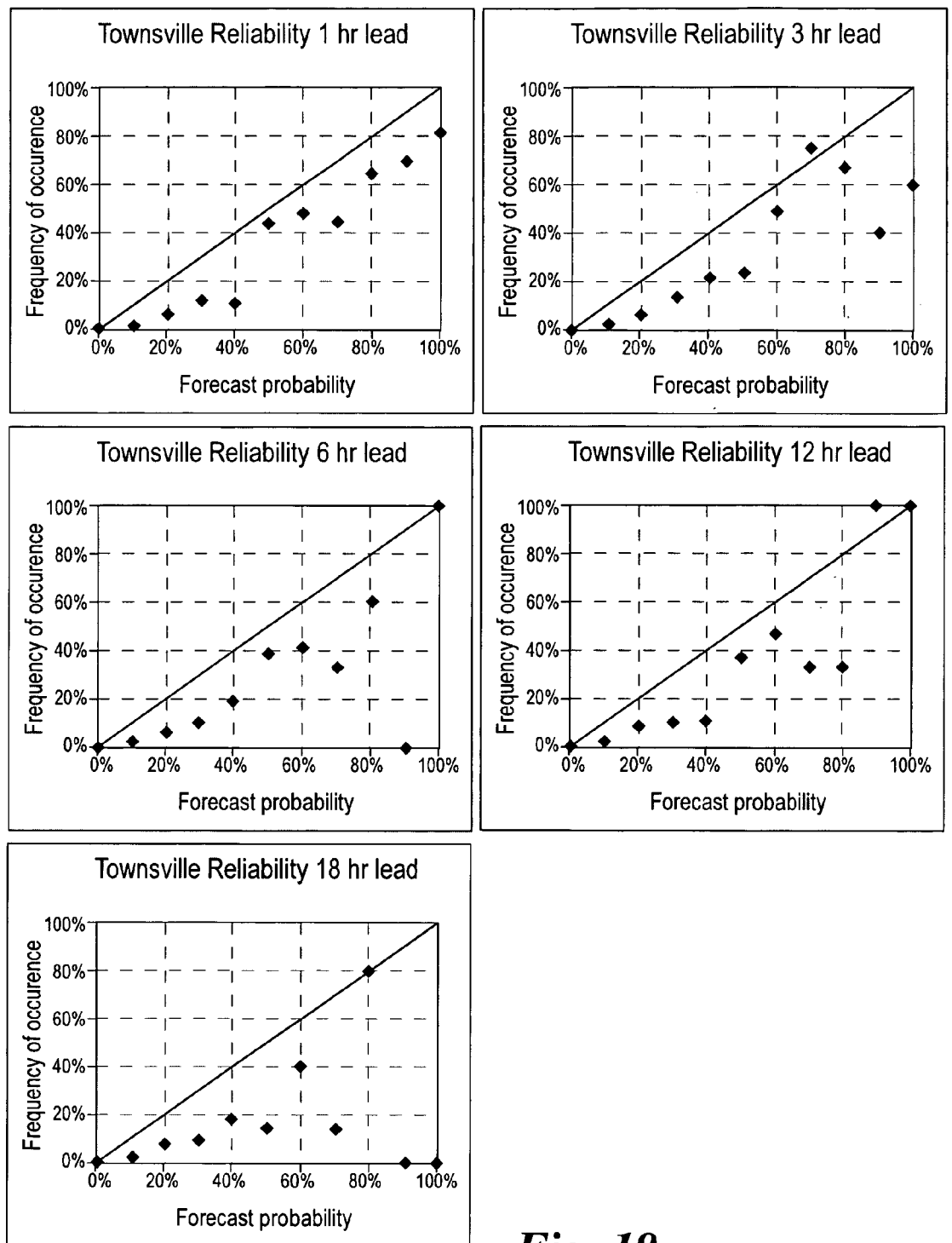
FIG. 19 shows exemplary reliability diagrams for Townsville for a plurality of exemplary lead times.
Figure 20:
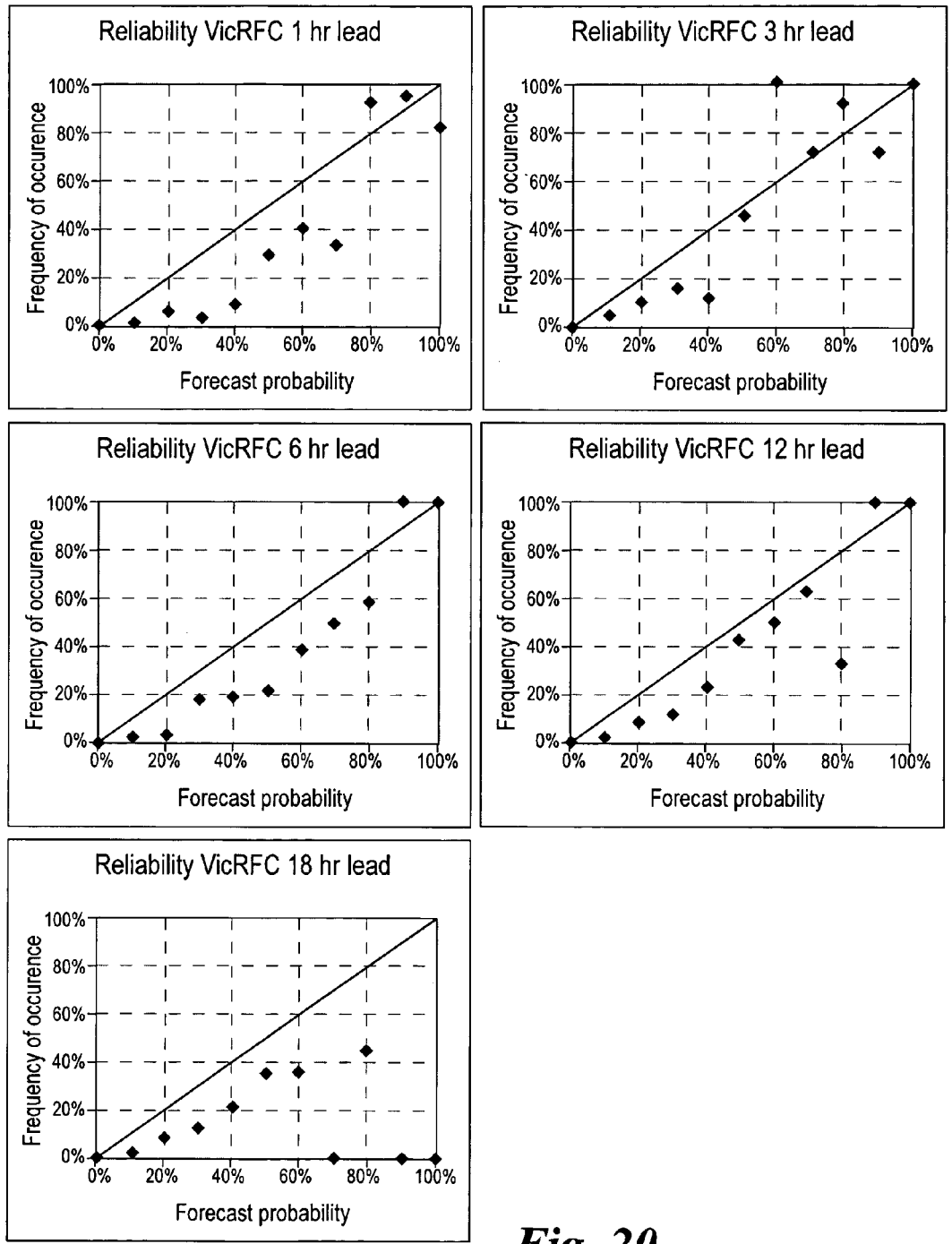
FIG. 20 shows exemplary reliability diagrams for Vic RFC for a plurality of exemplary lead times.
Figure 21:
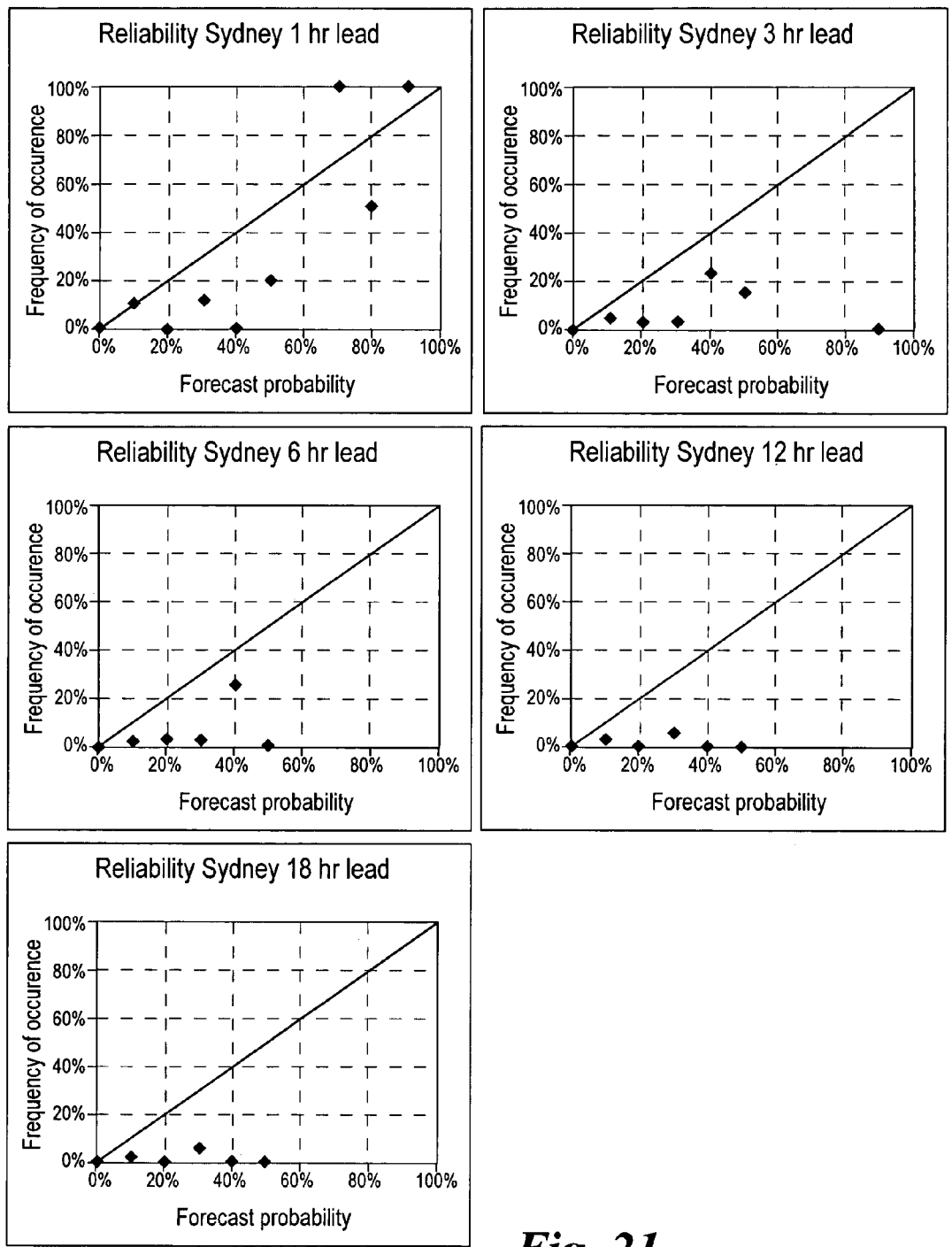
FIG. 21 shows exemplary reliability diagrams for SAMU for a plurality of exemplary lead times.

Reliability diagrams for Townsville, Vic RFC, and SAMU are shown in FIGS. 19-21, respectively. The reliability diagrams for Townsville and Vic RFC show clear overforecasting. The pattern of the overforecasting is similar to that observed in Murphy, A. H. and H. Daan, "Impacts of feedback and experience on the quality of subjective probability forecasts: Comparison of results from the first and second years of the Zierikzee experiment," Mon. Wea. Rev., 112, 413-423 (1984), the entire content of which is hereby expressly incorporated herein by reference. The poor reliability at SAMU is of concern. The rare nature of the events is undoubtedly a factor at Sydney. It is difficult to give high confidence to a rare event, especially at the longer lead times. The high impact of missed events at Sydney is probably also a factor.

It is tempting to use the knowledge of the past bias of individuals to recalibrate future forecasts toward greater reliability. In Harvey et al. (referenced above), in a study of very short lead time (<=60 min) forecasts of storms, split the data into high and low activity days and showed the effect of stress on $A_z$ and $\chi_c$. The split was a simple median division. They found that on high activity days, the decision threshold was more cautious, that is, a (lower) $\chi_c$. The study suggests that the forecasters' $\chi_c$ is not constant, and will vary depending on what Harvey et al. call stress. The factor causing the variation of $\chi_c$ to a more cautious value is possibly the forecasters' increased perception of a risk of adverse consequences when, in this case, the forecasters have a higher expectation of storms impacting on aircraft operations. Large amounts of data on individuals would be required to determine how their decision threshold varies with the weather situation, time, mood, etc. Another impediment to recalibration of probabilities produced by forecasters is the fact that, with TAFs, the events are usually infrequent. It would take several years to capture enough data to be able to recalibrate individual forecasters. By that time the forecasters would probably have transferred or retired. Murphy and Daan (referenced above) showed that, even with minimal feedback, forecasters can learn to improve their own reliability. Recalibration of automated forecasts produced by statistical or numerical methods would be less of a problem.

Costs were provided in this example by Qantas Airways for a flight from Singapore to Melbourne. When the flight plan is done prior to the flight leaving Singapore, the Melbourne TAF forecasts either alternate (ALT) conditions, INTER or TEMPO deteriorations in the weather, or good conditions above the alternate minima. For the sake of the current exercise, INTER and TEMPO forecasts are ignored. INTER forecasts (30 min of holding fuel) are absorbed into the company's reserve, and at Melbourne TEMPO is forecast only rarely. If the Melbourne TAF forecasts below alternate conditions, the aircraft takes on sufficient fuel to make an approach into Melbourne, and then to fly back to Adelaide if it cannot land at Melbourne. Adelaide is near the track about 300 mi NW of Melbourne. In this case the pilot will usually make an approach into Melbourne, knowing he or she has enough fuel to abort and fly back to Adelaide. If the Melbourne TAF forecasts conditions above the alternate minima, the pilot usually flies on to Melbourne and lands. However if the weather at Melbourne is below the alternate minima when the flight reaches Tailem Bend (TBD), a point on track abeam Adelaide, the pilot will divert to Adelaide.

The costs (the actual figures of which are commercially confidential, but which are represented by symbols for the dollar amount) required in order to calculate the false alarm cost and miss cost are shown in FIG. 22. The false alarm cost is readily available from this information, being the "cost to carry" the extra diversion fuel of $C. Calculation of the miss cost is more complex. Remember that the miss cost is that cost caused by a diversion over and above that cost accrued if the below minimum weather was correctly forecast, that is, above the cost of a hit. The cost of a hit depends on whether the pilot can actually land at Melbourne when the weather is below the alternate minimum. If the pilot can land safely at Melbourne when the forecast is a hit, then there is no extra cost over the false alarm cost of $C. However if he cannot land, then the aircraft must fly to Adelaide, and return to Melbourne when able to land there. The cost of the diversion is $(C+H+E+F) minus $I for fuel that is not used.

Thirty years of synoptic observations were analyzed for the Melbourne airport. It was found that of the number of occasions that the alternate minimum was breached, 28% of these also breached the ILS minimum, thus precluding landing. So the calculation of hit cost proceeds thus:

average hit cost=(0.72×$C)+[0.28×$(C+H+E+F−I)]
and average miss cost=$(C+H+E+F−I)−average hit cost.

Inputting actual dollar values, $CR$=false alarm cost/miss cost=0.132, and $p$(opt)=$CR$/(1+$CR$)=0.117.

From the Bureau of Meteorology's TAF verification, a typical value of the (h, j) pair is (0.75, 0.12) for Vic RFC forecasters at a lead time of 6 h. Using the assumption of equal variances, $p_c$=0.02 and d'=2.1 (typical skill measured at Vic RFC in the experiment at 6- and 12-h lead time), the closest value of the forecast probability that produces (h, f) values nearest (0.75, 0.12) is about 0.02. So one can say that the forecasters at Vic RFC are operating with an effective average probability of about 0.02 as their decision threshold for this forecast.

Figure 23:
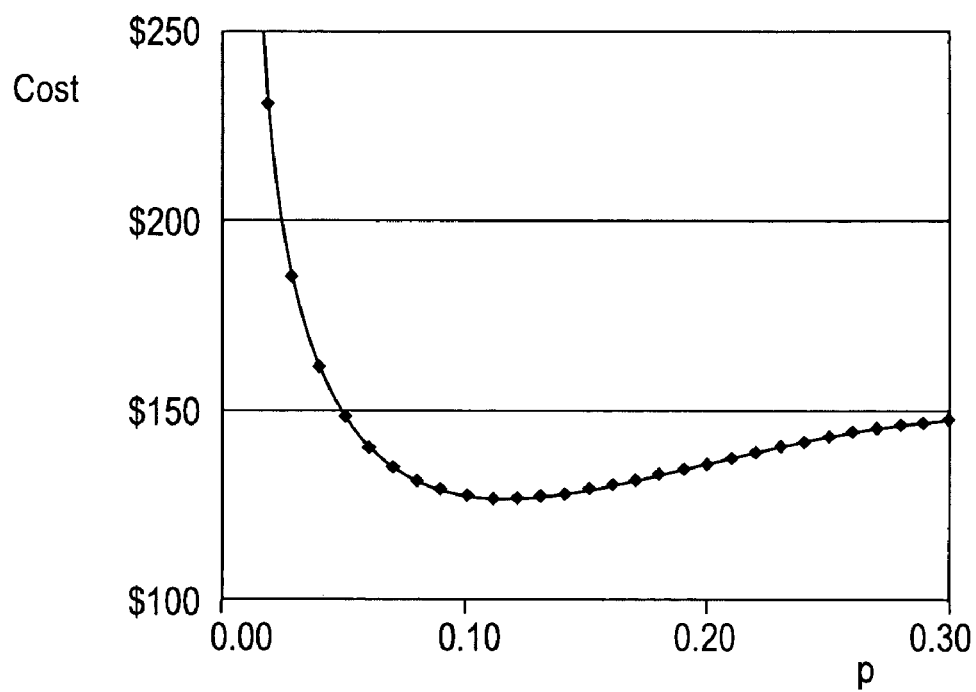
FIG. 23 shows a plot of cost vs. decision threshold for an exemplary Singapore to Melbourne flight.

Refer back now to equation (2) and use the false alarm cost and miss cost calculated for this flight. FIG. 23 is a plot of cost versus decision threshold for this flight. The false alarm cost is $1390, the missed cost is $10,535, d' is 2.1, and $p_c$ is 0.02. At a decision threshold probability of 0.02, the cost of the uncertainty in this forecasts is $231. If the forecast was reliably made at the optimum decision threshold, 0.117, the cost would have been $128. So a perfectly reliable forecast of the probability of below alternate minimum conditions would, in the long run and at the same skill, save about $103 per flight for the Singapore to Melbourne route. This is about 45% of the total cost of the uncertainty of the forecast.

Consider now the reliability diagrams for Vic RFC in FIG. 20. Assume a forecaster at Vic RFC forecast at a decision threshold of 0.117 for the Singapore to Melbourne flight. From the reliability diagrams, he or she would expect roughly 0.07 as the frequency of occurrence in the long run. This can then be considered as the effective decision threshold. A decision threshold of 0.07 leads to a cost of $135. So for this flight, even the moderately reliable forecasts as currently produced would provide most of the savings (41%) gained by perfectly reliable TAFs (45%).

Figure 24:
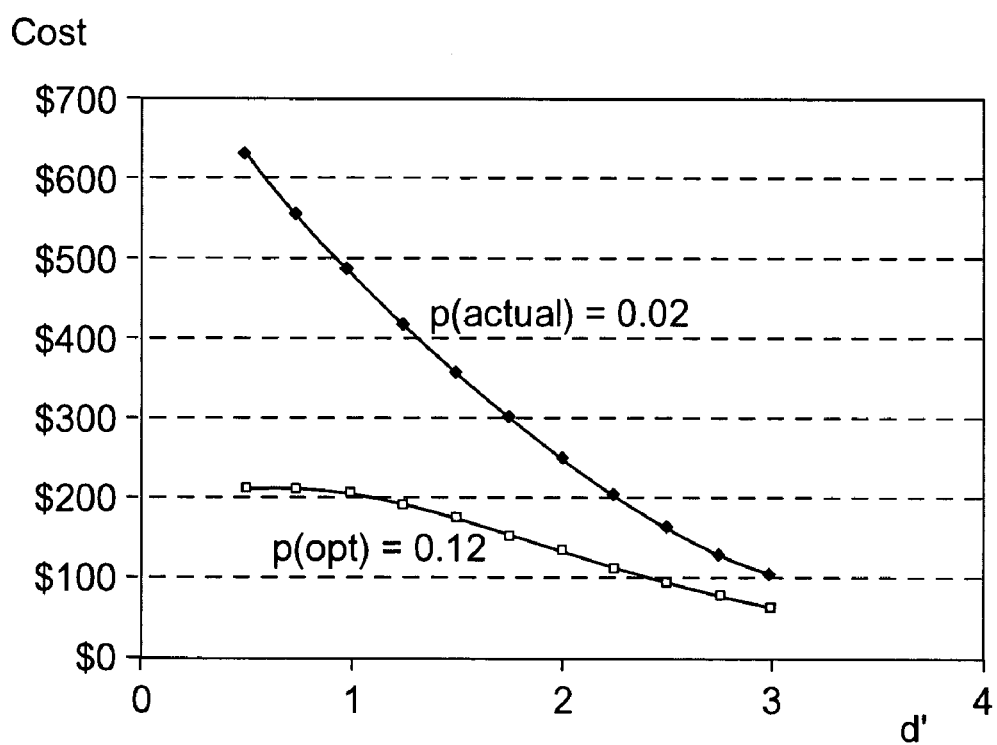
FIG. 24 shows plots of cost vs. skill for an exemplary Singapore to Melbourne flight.

FIG. 24 shows, for the same flight, how the modeled cost of the forecast varies with d', the index of skill. The two graphs are for the optimum decision probability of 0.117, and for the estimated actual decision threshold 0.02. The large difference in cost outcome for the two different decision probabilities is obvious, especially at low skill. Note that if the decision threshold is optimal, a decrease in skill does not matter all that much in economic terms. Therefore one could suggest that using near-optimal decision thresholds is more important than increasing skill, especially for low skill forecasts. The optimal decision threshold is solely a function of the operating costs of a particular flight and, thus, varies between flights. So reliable estimation of the probability of occurrence of the event must be applied to each flight in order to optimize savings, and the cost parameters for each flight used to determine whether extra fuel is required.

Note that the method of calculating the miss cost uses a quite crude climatology. The factor of 0.28, being the ratio of the time conditions are below the ILS minimum to that below the alternate minimum, is for all times of the day and months. A superior value for the miss cost, and thus CR and p(opt), could be obtained if there were adequate data to determine a matrix of these factors for different times and months. This would undoubtedly increase the potential for savings by using probabilities. Furthermore, if the conditional probability of weather below the ILS minimum given that the weather is below the alternate minimum could be forecast with a skill better than climatology, a more accurate p(opt) value could, on average, be calculated on a case-by-case basis.

Figure 25:
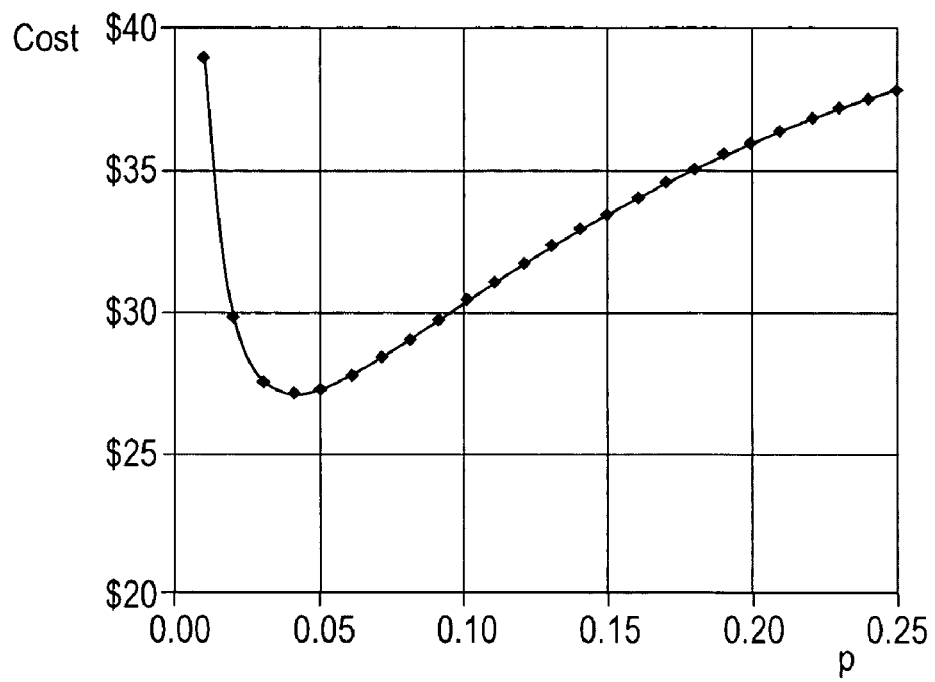
FIG. 25 shows a plot of cost vs. decision threshold for an exemplary Brisbane to Townsville flight.
Figure 26:
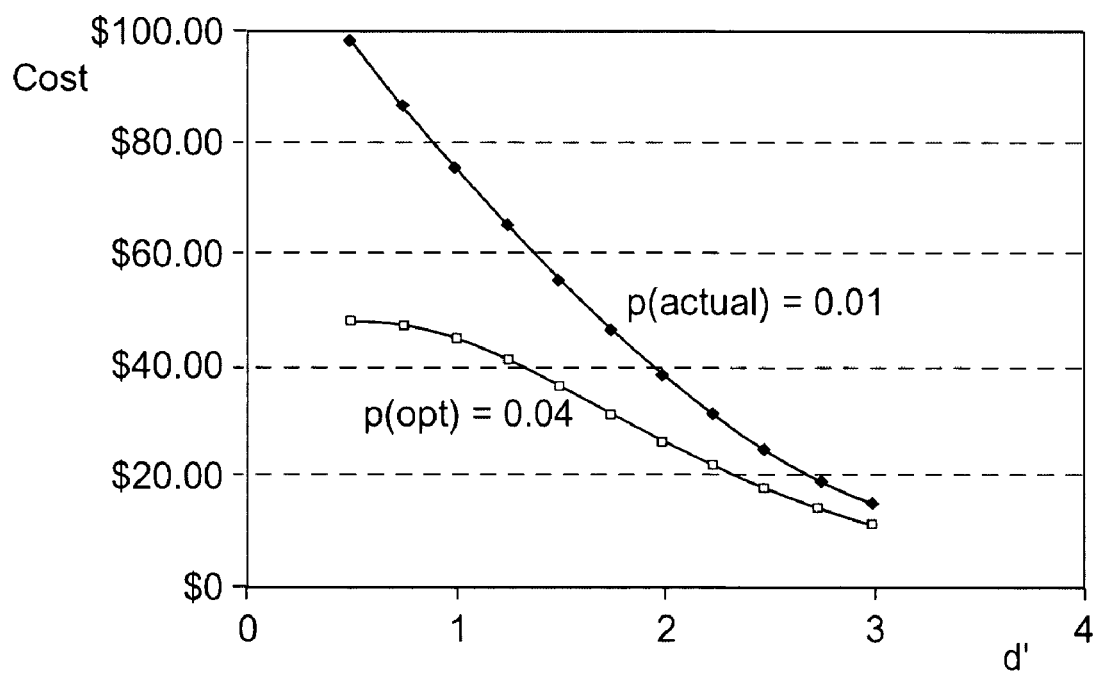
FIG. 26 shows plots of cost vs. skill for an exemplary Brisbane to Townsville flight.

FIGS. 25 and 26 are the same two graphs for a shorter flight of duration about 2 h, between Brisbane and Townsville. The false alarm cost is $200, the miss cost $4800, $p_c=0.01$, and the measured d' for Townsville forecasters was 2.0 at 3-h lead time. The measured average decision threshold for the group was 0.015, and taking into account the reliability diagram, the "effective" threshold would be about 0.01, even more conservative than that for Melbourne forecasters. At this threshold, the cost of the errors in this forecast is $38, and at the optimal decision threshold of 0.04 the cost is $27. So, in relative terms, the savings accrued by the use of probabilities is less for the shorter flight than for the longer, international flight. This is undoubtedly because of the relatively high false alarm cost, that is, the cost of carrying fuel over a long distance unnecessarily. Miss costs involve significant components that are fixed and do not depend on route length. Another interesting comparison between the two flights is the effect of a more adventurous (higher) decision threshold. The cost rises much more quickly from the minimum for the shorter flight as the decision threshold rises than for the long flight. In FIG. 25, if the decision threshold rises above 0.25, the cost savings accrued by using probabilities are lost. So the "sweet spot" for savings using probabilities is less than for the long flight.

EXAMPLE 2

In this example, observations-based statistical forecasts are investigated to demonstrate the economic value of such forecast. This example focuses on probabilistic forecasts of low ceiling and/or reduced visibility and the corresponding impact on forecast value for flights arriving at three major airports in the United States. In addition, costs for several flights arriving at each airport have been provided by a domestic, commercial carrier. These have been utilized to determine the optimal forecast probability above which extra fuel should be carried. As will be shown, the combination of improved short-term forecasts and identification of optimal forecast probabilities of the present invention can lead to greater forecast value, potentially saving the aviation industry millions of dollars per year.

Two data sets were utilized to develop the statistical forecast equations for this example. The first contained hourly surface weather observations for the period of January 1982 through December 1996. The second data set contained hourly observations spanning from January 1997 to July 2003. Each dataset included hourly observations of temperature, dew point, wind speed and direction, cloud cover (from which ceiling can be derived), visibility and present weather at over 1500 automated weather-observing sites around the United States. The earlier dataset is used solely for the development of climatological values, while the latter is utilized for both climatological purposes as well as the statistical forecast development.

In order to assess the skill of the statistical forecast equations, a database of Terminal Aerodrome Forecasts (TAFs) was obtained for a basis of comparison. These TAFs were produced by the National Weather Service office that is responsible for each of the three airports being examined in this study. Of interest to this experiment is whether the TAF predicts adverse weather such that flight dispatchers must specify that a given flight should add extra fuel. This archive of TAFs spans from April 2002 to May 2003.

A database of operating costs for flights arriving into each of the three major airports was obtained from a commercial airline. This data provided cost per flight information for a total of 18 daily flights, in 2003 dollars. These operating costs represent average costs for each flight during the April 2002 to May 2003 period; approximately 7500 flights in all. The flights used in this example were determined in consultation with the airline. They represent varying distances and departure/arrival times during the day. Thus, this study is not focused simply on a specific type of flight but rather a broad representation of an airline's typical daily flights.

There are two primary stages to the experiment in this example. First, probabilistic forecasts of low ceiling and/or reduced visibility must be created. Second, an optimal probability threshold must be calculated for each flight using the operating costs data. Both the probabilistic forecast and the TAF for each flight are then compared to the calculated optimal probability for each flight, determining whether either forecast would require additional fuel carriage. Each request for additional fuel incurs a cost, since extra fuel is needed simply to carry the requested additional fuel. Therefore, the cumulative cost of each forecast leads to the assessment of the economic value of the statistical forecasts.

Statistical forecast equations were developed. For this experiment, the forecast of interest was the probability of ceiling$\leq$2000 ft. and/or visibility$\leq$3 SM. The reason for these thresholds is that they are current FAA criteria for determining whether a given flight should add additional jet fuel in case the flight has to divert to an alternate landing site.

In order to duplicate the impact of the weather forecast on the decision processes for assessing fuel requirements, careful consideration must be given to the initialization and valid times for the observations-based forecasts. This is mainly because decisions on the loading of jet fuel typically are made during the dispatcher's flight planning, which usually takes place 1-2 h prior to the flight departure. Another complicating factor is due to the nature of the observations-based forecasts as well. These forecasts can be initialized and verified at the top of the hour. However, scheduled flights rarely arrive/depart exactly at the top of the hour. Therefore, taking all of this information into consideration, a unique forecast initialization time and valid time was determined for each flight.

It is important to note that while thunderstorms have a significant impact on aviation operating costs, the experiment of this example focused only on low ceiling and/or reduced visibility. Since only 18 daily flight departure/arrival times were considered, analysis of the observational data showed that very few thunderstorms occurred during these times. Moreover, of those convective events that did occur at a time of interest, nearly all resulted in a reduction in ceiling/visibility. However, it is believed that the absence of storm forecasts does not significantly affect the degree of savings extracted by the probability forecasts.

The optimal threshold for each flight was determined. When allocating costs, alternate fuel was assigned whenever the probability forecast was greater than or equal to the optimal decision probability for the particular flight. The traditional method of planning fuel was used for the TAF, as carried out by airline dispatchers under FAA regulations.

The table in FIG. 27 displays a breakdown of the cumulative costs per flight using the traditional TAFs and the observations-based probabilistic forecasts, in 2003 dollars. These costs represent total costs from April 2002 to May 2003. It is important to note that for each of the 18 flights, the use of the observations-based probabilistic forecasts resulted in lower cumulative costs than the traditional TAFs. In fact, the average savings per flight is $23K over 14 months. Projecting this savings across 2000 to 3000 daily flights typical of a major carrier, the annual savings approaches $50M per year. This significant savings is simply due to a transition from a deterministic TAF forecast to a probabilistic forecast.

From the above description, it is clear that the present invention is well adapted to carry out the objects and to attain the advantages mentioned herein, as well as those inherent in the invention. Although the foregoing invention has been described in some detail by way of illustration and example for purposes of clarity of understanding, it will be apparent to those skilled in the art that certain changes and modifications may be practiced without departing from the spirit and scope of the present invention, as described herein. Thus, the present invention is not intended to be limited to the embodiment shown, but is to be accorded the widest scope consistent with the principles and features described herein.

What is claimed is:

1. A method of assigning alternate fuel for an aircraft for a flight, comprising the steps of:
   receiving at least one probabilistic forecast of a weather event for a desired destination;
   receiving an optimal probability threshold for the flight; and
   comparing the probabilistic forecast to the optimal probability threshold for the flight and assigning alternate fuel if the probabilistic forecast is greater than or equal to the optimal probability threshold.

2. The method of claim 1, wherein the at least one probabilistic forecast relates to ceiling conditions.

3. The method of claim 1, wherein the at least one probabilistic forecast relates to visibility conditions.

4. The method of claim 1, wherein the at least one probabilistic forecast is generated utilizing an observations-based statistic.

5. The method of claim 1, wherein the optimal probability threshold is generated utilizing operating costs data associated with the flight.

6. The method of claim 5, wherein the optimal probability threshold is generated using the formula $p(opt)=CR/(1CR)$, where CR is the cost ratio and equals the false alarm cost for the flight divided by the miss cost for the flight.

7. A system for assigning alternate fuel for an aircraft for a flight, comprising:
   a forecast module generating at least one probabilistic forecast of a weather event for a desired destination;
   a threshold module generating an optimal probability threshold for the flight;
   a decision module receiving the at least one probabilistic forecast from the forecast module and receiving the optimal probability threshold from the threshold module, the decision module comparing the probabilistic forecast to the optimal probability threshold for the flight and assigning alternate fuel if the probabilistic forecast is greater than or equal to the optimal probability threshold.

8. The system of claim 7, wherein the at least one probabilistic forecast relates to ceiling conditions.

9. The system of claim 7, wherein the at least one probabilistic forecast relates to visibility conditions.

10. The system of claim 7, wherein the at least one probabilistic forecast is generated by the forecast module utilizing an observations-based statistic.

11. The system of claim 7, wherein the optimal probability threshold is generated utilizing operating costs data associated with the flight.

12. The system of claim 11, wherein the optimal probability threshold is generated using the formula $p(opt)=CR/(1=CR)$, where CR is the cost ratio and equals the false alarm cost for the flight divided by the miss cost for the flight.

* * * * *

UNITED STATES PATENT AND TRADEMARK OFFICE
CERTIFICATE OF CORRECTION

PATENT NO. : 7,305,304 B2 Page 1 of 1
APPLICATION NO. : 11/243726
DATED : December 4, 2007
INVENTOR(S) : Stephen M. Leyton and Ross Keith It is certified that error appears in the above-identified patent and that said Letters Patent is hereby corrected as shown below:

In the Specification:
Column 1, line 18: After "Grant" delete "200" and replace with -- 2001 --.
Column 9, line 23: Delete "pridctors" and replace with -- predictors --.
Column 14, line 8: After "respect" delete "top" and replace with -- to $p$ --
Column 20, line 9: Delete "(h,j)" and replace with -- $(h,f)$ --
Column 20, line 54: Delete "d9" and replace with -- d' --
Column 22, line 21: Delete "(h,j)" and replace with -- $(h,f)$ --
In the Claims:
Column 26, line 12: Delete "(1CR)" and replace with -- (1 + CR) --
Column 26, line 42: Delete "(1=CR)" and replace with -- (1 + CR) --

Signed and Sealed this

Sixth Day of May, 2008

JON W. DUDAS
*Director of the United States Patent and Trademark Office*